United States Patent [19]

Stoddard et al.

[11] Patent Number: 4,972,344
[45] Date of Patent: Nov. 20, 1990

[54] DUAL BEAM OPTICAL TURNTABLE

[75] Inventors: Robert E. Stoddard; Robert N. Stark, both of Sunnyvale, Calif.

[73] Assignee: Finial Technology, Inc., Sunnyvale, Calif.

[21] Appl. No.: 267,167

[22] Filed: Nov. 4, 1988

Related U.S. Application Data

[63] Continuation-in-part of Ser. No. 868,611, May 30, 1986, Pat. No. 4,870,631.

[51] Int. Cl.$^5$ .............................................. G11B 11/18
[52] U.S. Cl. .................................. 369/18; 369/44.11; 369/112; 369/44.21; 250/201.4
[58] Field of Search ................... 369/18, 275, 17, 110, 369/111, 100, 44–47, 112, 124; 250/201.4; 382/65

[56] References Cited

U.S. PATENT DOCUMENTS

| | | | |
|---|---|---|---|
| 1,196,973 | 7/1933 | Friebus | 369/18 |
| 4,621,351 | 11/1986 | Baer et al. | 369/112 X |
| 4,760,247 | 7/1988 | Keane et al. | 382/61 X |
| 4,870,631 | 9/1989 | Stoddard | 369/18 |

FOREIGN PATENT DOCUMENTS 54-102106 8/1979 Japan ..................................... 369/18

Primary Examiner—Stuart S. Levy
Assistant Examiner—Hoa T. Nguyen
Attorney, Agent, or Firm—Fliesler, Dubb, Meyer & Lovejoy

[57] ABSTRACT

Disclosed is an optical turntable system for optically playing phonograph records having a recorded signal in a groove formed by a wall having a position modulated by the recorded signal. An optical unit includes an optical source providing a first light beam incident onto the wall to provide a reflected beam from the wall forming a reflected spot at a reflected position proportional to the recorded signal and also includes an optical sensor for sensing the reflected position of the reflected spot to provide an output data signal proportional to the recorded signal. The optical unit also includes a tracking assembly which functions to position the optical unit over the section of the groove of interest as the record turns.

24 Claims, 4 Drawing Sheets

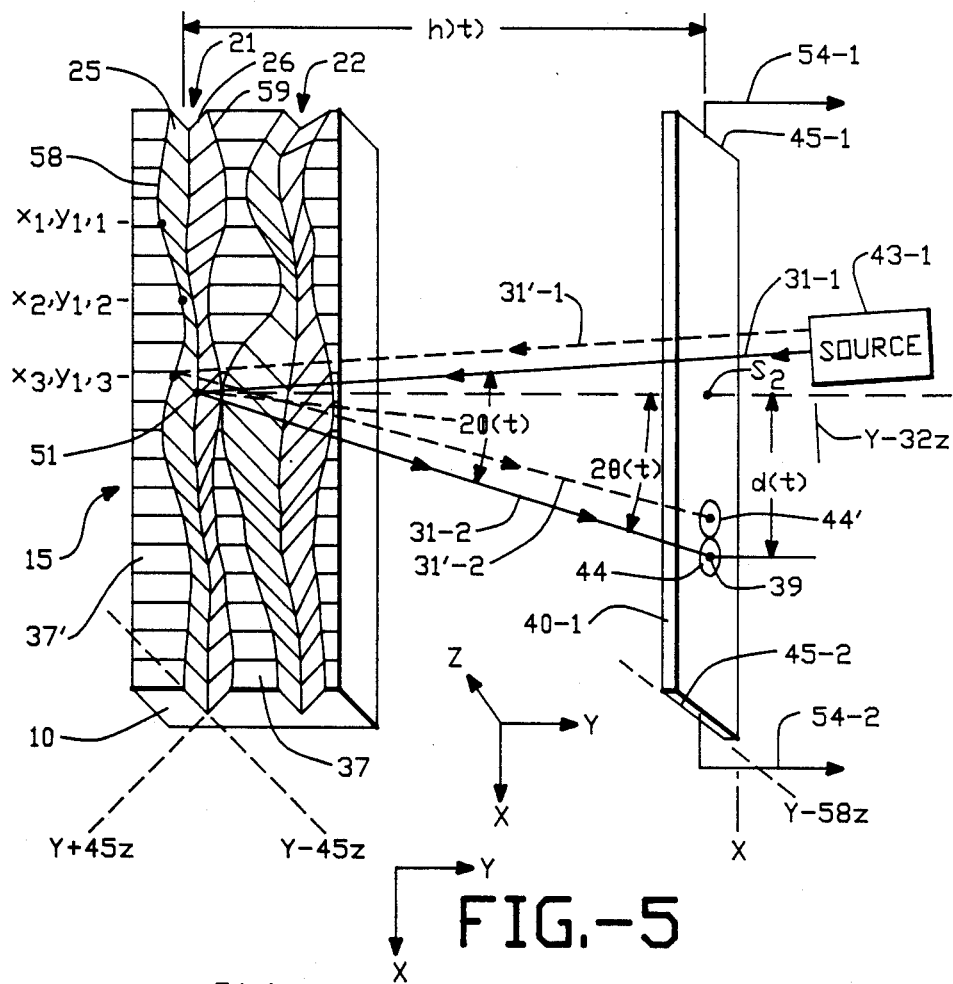
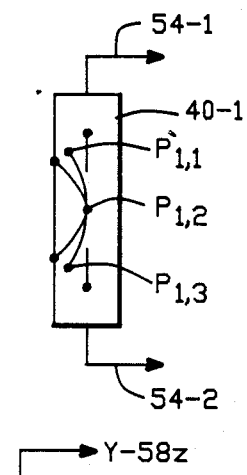
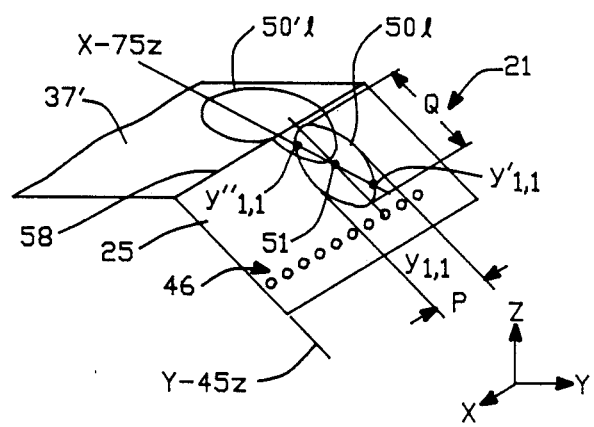
FIG.-5
FIG.-6   FIG.-7

DUAL BEAM OPTICAL TURNTABLE

CROSS-REFERENCE

This application is a Continuation-In-Part of the copending application entitled OPTICAL TURNTABLE SYSTEM invented by Robert E. Stoddard and Robert N. Stark, Ser. No.: 06/868,611; filed: May 30, 1986 now U.S. Pat. No. 4,870,631.

BACKGROUND OF THE INVENTION

The present invention is directed to methods and apparatus to non-destructively read and play the audio signal of a standard vinyl phonograph record. Specifically, the present invention relates to audio systems which employ light beams and optics, rather than a mechanical stylus, to follow the spatial modulations of the record groove.

Conventional analog audio records store information in the grooves. The grooves are typically formed as left and right walls cut into a master disk with a mechanically vibrating stylus. The physical geometry of the left and right groove walls, known as modulations, carry the audio waveform as recorded information. Many conventional vinyl records are reproduced from the master disk.

A record is played with a device commonly known as a "pick-up." Typically, a stylus or needle is mounted in the pickup, and lowered into the groove, which acts as a guide for the stylus to follow. The stylus is in physical contact with the groove. As the record is rotated on a turntable, the changes in the right and left groove wall geometries, that is, the surface displacements, cause the stylus to vibrate. The stylus vibrations are then converted into electrical signals that are delivered to the input of an amplifier.

Conventional analog recording and reproduction systems have several inherent flaws. Imperfections in the recording medium and in the reproduction system can alter the playback waveform and distort the sound. Conventional reproduction systems are sensitive to "ticks" and "pops" caused by imperfections or dust particles in the grooves, surface scratches and low frequency noise caused by the system's physical vibration. In addition, since the stylus is in physical contact with the record groove, record wear (typically in the form of pits in the groove walls) is inevitable. Lastly, since conventional reproduction systems are mechanical, inertia affects the response characteristics.

In recent years, there has been research into and development of optical recording and reproduction systems. In general, digital reproduction systems use laser sources (coherent light) to detect the presence or absence of reflected light from recorded "pits" along a track. These digital systems require recording, processing and reproduction techniques very different from those for the conventional analog record. The use of light and optics to play conventional analog records has largely been ignored or found to be unsatisfactory.

A conventional analog (phonograph) record has a recorded mono signal (music, for example) in a groove where the groove is formed by at least a first wall having a position modulated by the recorded signal.

A conventional analog record has a recorded stereo signal encoded in the velocity of two orthogonal groove walls. The two walls form a "V" groove in the record with each wall forming an angle of approximately 45 degrees with the plane of the record. The flat part between the grooves is called the land. The top edge of each wall is called the land/groove interface. Record parameter values that have been measured include:

| | |
|---|---|
| Groove Width | 0 to 150 um |
| Groove excursion | 0 to 150 um |
| Land Width | 0 to 300 um |
| Wall Angles | 41 to 49 degrees |
| Modulation Angles | −45 to 120 degrees |
| Land Angles from Horizontal (warp) | −2 to 10 degrees |
| Groove Pitch | 50 to 300 um/groove |

These measured values extend far outside the standards set by the standards committees of the RIAA, AES, and NAB.

The modulation angle for a conventional record is the angle that the groove wall makes with respect to the tangential velocity vector. This angle is related to the desired signal by wall angle $= \mathrm{atn}\{V_s/V_t\}$ where $V_s$ = normal velocity vector (music)

$V_t$ = tangential velocity

= $2\pi R/1.8$ sec $R$ = groove radius from spindle

In addition to the problems caused by values outside the standard ranges, there are other record defects that occur in a large number of records. These defects result from cutting the groove wall at modulation levels higher than the cutting stylus can controllably cut and from carelessness in the cutting and mastering process.

When the groove is cut in the lacquer master with a stylus that is dull, oriented improperly or heated improperly, some of the material (chip) removed from the groove is deposited in chunks on the land/groove interface. These chunks of material are called "horns". With properly cut records, the material (chip) comes out of the groove in a fine string. The horns that do exist are removed from some records in an intermediate mastering step. For optical systems, these horns are irregularly shaped and tend to scatter incident light rather than uniformly reflecting incident light. The horns also make the location of the land/groove interface difficult to determine.

In theory the two groove walls are independent, representing two independent audio channels. The record industry, recognizing that, in general, the listener cannot hear stereo effects below 400Hz, has added the left and right signals together to form a mono signal below 400Hz. This mono signal is cut into the record as a constant groove width lateral motion.

Vertical modulation occurs when the left and right signals are 180 degrees out of phase and the groove width varies with the signal. The lateral groove excursions have been observed to exceed the groove width for signals up to 450Hz. These excursions must be tracked by the tracking system to prevent the light beams from improperly sensing (playing) the land rather than properly sensing the groove.

The audio information signal is cut in the groove wall velocity so that the position waveform (the groove wall excursion) is proportional to 1/f where f is the information signal frequency. If this relationship were used directly, the 20Hz signal-wall motion would move so much that the groove could not be cut and the excursion for a 20KHz signal would be 1000 times smaller than for a 20Hz signal and would, therefore, be lost in noise. To compensate for this large range, the RIAA (and the record industry) has accepted a standard RIAA equalization filter to reduce the levels at low frequencies and boost the levels at high frequencies before the cutting process. The inverse of the RIAA filter is used in playback to recreate the desired signal.

In spite of the RIAA filtering, however, the low frequency signals have much greater excursions than the high frequency signals so that the lower frequency signals need to be tracked more exactly than the higher frequency signals.

Various methods and systems have been proposed to play vinyl records using light and optical sensors to replace the conventional mechanical stylus and cartridge systems. Many of these systems require the light hitting the record to maintain its proper location with respect to the groove being played. Tracking techniques that have been used have produced tracking errors and audio distortion when playing many records.

The above-identified cross-referenced patent application discloses an optical turntable system for optically playing phonograph records without mechanically contacting the records and therefore without causing wear to the records. In that patent application, an optical unit includes an optical source providing a first light beam incident onto the wall to provide a reflected beam from the wall at a reflected angle proportional to the recorded signal. The optical unit also includes an optical sensor for sensing the reflected angle of the reflected beam to provide an output data signal proportional to the recorded signal. A drive assembly moves the record relative to the optical unit.

The optical unit is partitioned into a data extraction unit and a tracking assembly. The tracking assembly functions to position the optical unit over the section of the groove of interest as the record turns. The optical unit employs optical detectors so that contact with the record is not required either for data extraction or for tracking.

In an embodiment described in the cross-referenced patent application, the tracking assembly includes a vertical unit for positioning the optical unit a predetermined height from the record, includes a lateral unit for lateral positioning, and includes a tangential unit for tangential positioning. The lateral unit has a lateral detector for detecting the lateral position of the groove and for providing a lateral error signal as a function of the lateral displacement of the light beam relative to the groove. A lateral servo is responsive to the lateral error signal for tracking the light beam in the groove. The lateral detector includes a first detector for providing a first detector signal for indicating the lateral position of the first wall and includes a second detector for providing a second detector signal indicating the lateral position of the second wall. An electronic circuit is provided for processing the first detector signal and the second detector signal to provide the lateral error signal.

In the optical unit of the cross-referenced patent application for stereo operation, a first detector includes a first optical source to provide a first light beam incident onto the first wall which provides a first reflected beam to a first sensor. A second detector includes a second optical source to provide a second light beam incident onto the second wall which provides a second reflected beam to a second sensor.

In the stereo system, the incident laser beams are focused into small spots, one on each groove wall. The incident beams are directed in the plane normal to the tangential velocity vector at angles from approximately 50 to 70 degrees above the plane of the land which is the horizontal plane of the record. The reflected beams from the groove walls are reflected at angles of approximately double the groove-wall modulation angles. Each reflected beam (first or second) has a position measured by the centroid of the beam as the reflected beam impinges on a sensor. Each sensor is a position sensitive device (PSD) sensor that measures the position of the beam and produces an output signal proportional to that position. By processing the output signals from the PSD sensors, signals proportional to the audio signals cut into the groove walls are produced and also separate signals proportional to the total light power collected by the PSD sensors are produced.

The turntable system employs independent vertical (warp and vertical changes) and lateral (groove motion) tracking systems to keep the incident beam hitting the groove wall properly. The vertical tracking system reflects a laser beam off from the horizontal record surface (the land) and a sensor converts the motion of the reflected beam into a signal proportional to the distance of the record below the optical unit. A portion of the optical unit is moved vertically under servo control to keep the gap between the optical unit and the record at a constant height as the record moves.

In the cross-referenced patent application, the lateral tracking system uses the two data beams to produce the tracking information. The data beams are aligned so that the beams reflected off from the groove wall being played will be partially truncated by the top of the opposite groove wall as the reflected beam is reflected toward the PSD sensor. The two data beams are directed by a servo-controlled scanner mirror and thus are slaved together as they impinge on the record. If the beams are too far to the left, the right channel PSD sensor collects less light than the left channel PSD sensor, indicating a positive lateral tracking error. If the beams are too far to the right, the left PSD sensor collects less light than the right PSD sensor, indicating a negative lateral tracking error. The servo controlled scanner mirror is dynamically positioned to keep the intensity collected by the two PSD sensors equal to each other thereby providing the desired tracking.

While the lateral tracking system in the cross-referenced application is simple, it has a number of fundamental problems. First, the audio signal is derived from a beam that is partially truncated. This truncation tends to create some noise and distortion in the audio signal. Second, the truncation occurs on the land/groove interface, a region where horns, scratches, pits or other anomalies distort the truncating edge. These anomalies add to the distortion and noise in the audio signal. Third, the incident beams are forced deeper into the groove for wider groove widths. When the incident beam is deeper into the groove, a greater portion of the reflected beam does not reflect out of the groove and back to the PSD sensor due to increased truncation on the opposite groove wall. Fourth, the system actually tracks movements of the opposite groove wall through truncation on the opposite wall rather than tracking the wall from which the audio signal is being derived. Fifth, the tracking system does not provide information on the actual physical trajectory independently for each groove wall which is useful in order to correct some audio distortions.

In light of the above background, there is a need for a tracking system that corrects all of these problems and which provides an improved optical turntable system.

SUMMARY OF THE INVENTION

The present invention is an optical turntable system for optically playing phonograph records without mechanically contacting the records and therefore without causing wear to the records. In the turntable system, an optical unit includes an optical source for providing a first light beam incident onto a groove wall to provide a reflected beam from the wall at a reflected angle proportional to the recorded signal. The optical unit also includes an optical sensor for sensing the reflected angle of the reflected beam to provide an output data signal proportional to the recorded signal. A drive assembly moves the record relative to the optical unit.

The optical unit is partitioned into a data extraction unit and a tracking assembly. The tracking assembly functions to position the optical unit over the section of the groove to be sensed as the record turns. Since the optical unit employs optical detectors, no contact with the record is required either for data extraction or for tracking.

The present invention includes an improved groove tracking system which separates the data (audio extraction) light beams from the tracking light beams. The data beams follow the groove wall just below the land/groove interface. The data beams preferably follow the groove wall near to, but without being on, the land/groove interface since the land/groove interfaces frequently have vinyl deformations that corrupt sensing.

In one preferred embodiment, an independent set of laser beams and optics are provided both for tracking and for data extraction. The preferred embodiment includes a pair of laser beams from separate lasers, a tracking laser and a data laser, that are each focused onto the same groove wall and for stereo operation onto both groove walls.

For each groove wall, a tracking beam from the tracking laser and a data beam from the data laser are merged by a beam combiner (beam splitter) such that they are approximately parallel to each other and mostly coincident on the same spot. After the beam combiner, the beam pair reflects from a servo controlled scanner mirror, through a focusing objective lens, and onto the groove wall. The two beams are nonparallel by about 0.026 degrees in the crosstrack direction going into the focusing lens. This angle separates the two focused spots on the groove wall by approximately 15um. The tracking beam follows the top of the groove wall at the land/groove interface and the data beam follows about 15um below on the groove wall. Both of the reflected beams hit the reflected beam sensor with nearly identical geometry.

The two lasers, data and tracking, are timemultiplexed so that the tracking laser is on when the data laser is off and vice versa. The two lasers are both clocked at 50% duty cycle. The output of the sensor is sampled and demultiplexed to form the tracking signal and the data signal. The demultiplexing is controlled by the same clock frequency that controls the laser switching. The two demultiplexed outputs are passed through low-pass filters to reconstruct the proper tracking and data signals.

Each data and tracking beam pair is moved by a scanner mirror in a servo system that keeps the total collected light power from the reflected tracking beam at half of its possible peak level. This servo system keeps the tracking beam half on the groove wall and half on the land above the groove wall.

The audio signal is derived from the PSD sensor position output from the data laser phase of the demultiplexed PSD sensor output.

While the use of optics in connection with records has been proposed in many forms, a satisfactory and economical optical system for the optical playback of conventional phonograph records is still not readily available.

In light of the above background, there is a need for an improved, economical optical turntable system capable of playing conventional phonograph records.

The present invention employs separate laser beams to track the groove wall (tracking beam) and to extract the audio signal (data beam) and provides a long-needed optical system.

The primary advantages of using light and optics in the present invention include low mechanical inertia (leading to better sound reproduction), non-contact with the record surface (and consequently no record wear and no requirement for stylus replacement), and the ability to play old, stylus-damaged records. Additional advantages from the present invention include electrostatic immunity, rumble immunity, and acoustic feedback immunity.

In accordance with the above summary, the present invention achieves the objective of providing an improved turntable system capable of providing superior data extraction and playing of conventional records using light and optics.

The foregoing and other objects, features and advantages of the invention will be apparent from the following detailed description in conjunction with the drawings.

BRIEF DESCRIPTION OF THE DRAWINGS

FIG. 5 is a isometric view of the dual beam source with incident data and tracking light beams on the left wall of a groove section and dual beam sensors for receiving data and tracking reflected beams.

FIG. 6 depicts the trajectories of the data spot on the sensor during data extraction.

FIG. 7 is a isometric view of the data and tracking spots on the left wall of a groove section.

DETAILED DESCRIPTION

Figure 1:
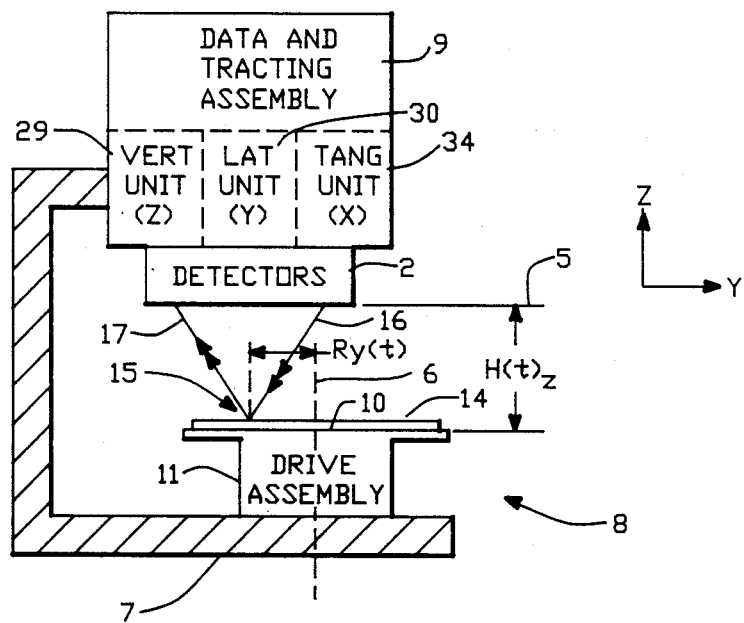
FIG. 1 depicts a schematic representation of the optical turntable system of the present invention.
Figure 2:
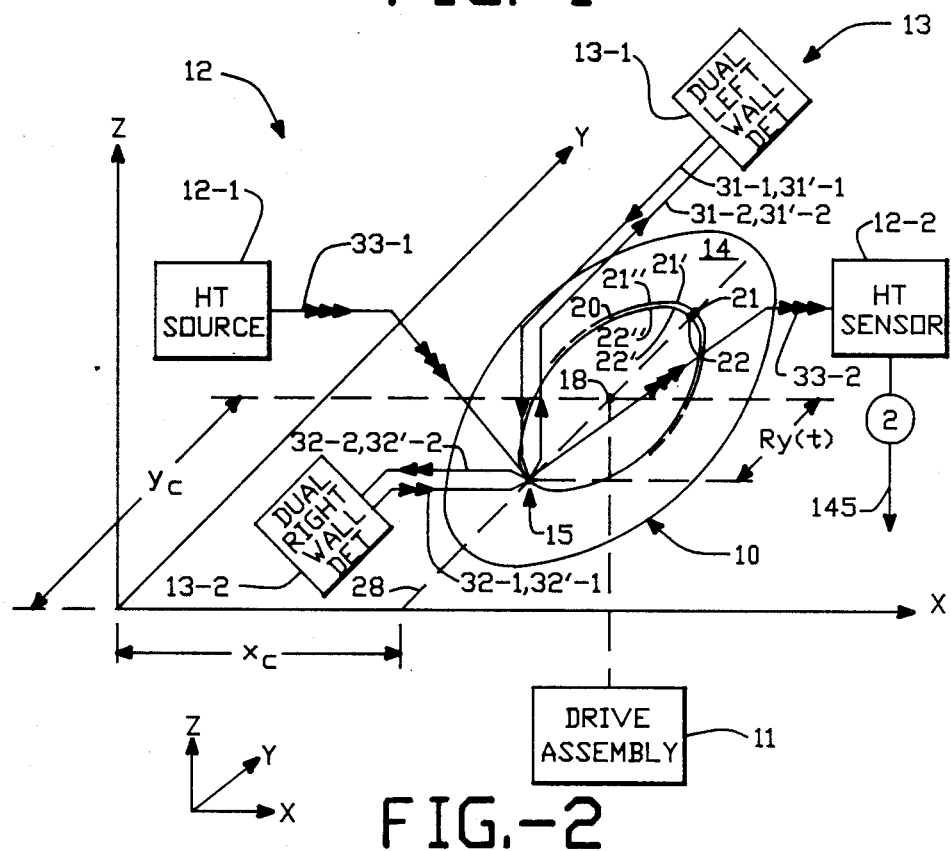
FIG. 2 represents an isometric schematic representation of the FIG. 1 system.

1.1 Overall System (FIGS. 1–2)

In FIG. 1, the optical turntable system 8 is adapted to sense (play) the phonographic record 10. The record 10 has its top surface 14 lying in the XY plane which is normal to the YZ plane of the paper. The record 10 is rotated relative to the optical sensing region 15 by the drive assembly 11. The sensing region 15, which lies generally on and into the top surface 14 of record 10, is sensed optically by the data and tracking assembly 9 by means of the incident light rays 16 and the reflected light rays 17.

In order to obtain accurate reproduction of the recorded data on record 10, the height, $H(t)_z$, of the record surface 14 relative to the optical plane 5 of the assembly 9 is detected and controlled in the vertical (Z-axis) direction. Similarly, the sensing region 15 translates, relative to the central axis 6 of the record 10, in the lateral (Y-axis) direction in order to follow the spiral groove in the record 10 as record 10 rotates.

In FIG. 1, the assembly 9 includes a vertical unit 29, a lateral unit 30, a tangential unit 34 and detectors 2. The vertical unit 29 functions to detect and control the Z-axis height, $H(t)_z$, of the assembly 9. The lateral unit 30 functions to detect and control the Y-axis, lateral position of assembly 9. As the record 10 rotates, the tangential unit 34 functions to detect and compensate for variations in the X-axis direction of the position of record 10. The detectors 2 include detectors for detecting data (sound) signals and for detecting tracking signals from the record 10.

In FIG. 2, a three dimensional isometric view of the record 10 relative to an XYZ coordinate system is shown. The surface 14 of the record 10 generally lies in the XY plane. The drive assembly 11 drives the record 10 in the clockwise direction when viewing the XY plane in the negative Z-axis direction.

In FIG. 2, various parts of the assembly 9 of FIG. 1 are shown. The height detector 12 and the wall detectors 13 in FIG. 2 are parts of the detectors 2 of FIG. 1. In FIG. 2, detector 12 is represented as a height source 12-1 and a height sensor 12-2. The detectors 13 include the dual left wall detector 13-1 and the dual right wall detector 13-2.

The record 10 has a spiral groove 20, formed into surface 14, which varies in width and depth. These variations in the groove represent the recorded data signal. The sensing region 15 defines the location where the rays 16, focused by the detectors 2, form small optical spots.

In FIG. 2, the height source 12-1 transmits the rays 33-1 to the sensing region 15 and the reflected rays 33-2 are sensed by the height sensor 12-2. The height detector 12 is utilized to detect the height, $H(t)_z$, of the surface 14 relative to the optical plane 5 of the tracking assembly 9 (see FIG. 1) and provides a control signal on lines 145 to the vertical unit 29 of FIG. 1 which functions to maintain the height, $H(t)_z$, a constant.

In FIG. 2, the dual left wall detector 13-1 generates the incident rays 31-1 and 31'-1, which are incident on the sensing region 15, and receives the reflected rays 31-2 and 31'-2 from region 15. Similarly, the dual right wall detector 13-2 transmits the incident rays 32-1 and 32'-1 onto the sensing region 15 and receives back the reflected rays 32-2 and 32'-2.

Figure 3:
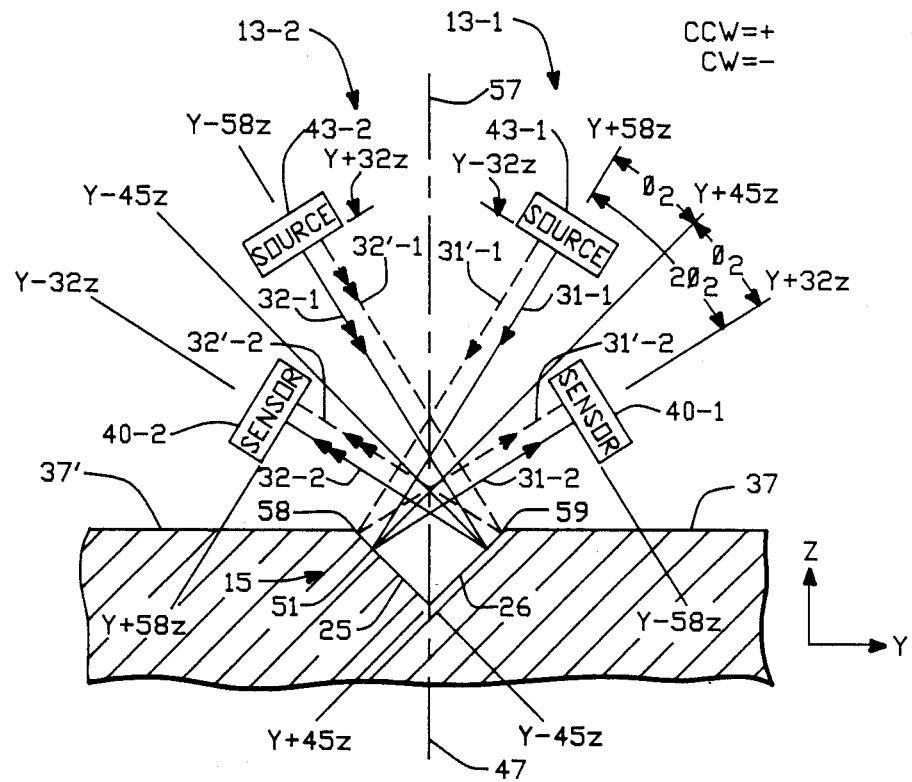
FIG. 3 depicts a schematic cross-sectional view of a groove section and the left and right wall detectors.

In FIG. 3, groove section 21 has a left groove wall 25 and a right groove wall 26. In this description, the designations "left" and "right" are given as if the groove section were being viewed in the negative X-axis direction. Of course, the viewing in this direction is arbitrary and the orientation could be as if the groove section were being viewed in the positive X-axis direction, in which case the left and right designations would be reversed.

The rays 31-1, 31'-1, 32-1, 32'-1, and 33-1 of FIG. 2 correspond to the incident rays 16 in FIG. 1 and the rays 31-2, 31'-2, 32-2, 32'-2, and 33-2 in FIG. 2 correspond to the reflected rays 17 in FIG. 1.

With the coordinate system of FIG. 2, the tangential or in-track direction of the groove 20 within the sensing region 15 is generally parallel to the X axis. Similarly, the lateral direction of the groove 20 within the sensing region 15 is generally in the Y-axis direction.

For purposes of explanation, different sections of the groove 20 within the proximity of the sensing region 15 are examined. In FIG. 2, two short and adjacent sections 21 and 22 of the groove 20 can be analyzed when the record 10 has been rotated to have the section 21 within the sense region 15. Each section, like section 21, is uniquely defined by its Y axis dimension when rotated within the sensing region 15. In FIG. 2, the center of the record 10 is located at $x_c$, $Y_c$. The displacement along the Y-axis of the sensing region 15 relative to the center 18 of the record 10 is given as a radial location, $R_y(t)$, where y has a different value for each different section of the groove 20 and is a function of time, t.

In FIG. 3, the left wall detector 13-1 includes a dual optical source 43-1 and a dual optical sensor 40-1.

Similarly, the right wall detector 13-2 includes the dual source 43-2 and the dual sensor 40-2.

Light from the source 43-I in a data beam 31-1 is incident along the $Y_{+58z}$-axis and impinges in the region 15 onto the left wall 25 at a data spot having a center point 51. The reflected data beam 31-2 is along the $y_{+32z}$-axis and is incident on the data sensor 40-1 at the data spot center $S_2$.

The axis $Y_{+45z}$ is normal to the left wall 25 at the point of incidence 51. The incident data beam 31-1 is at an angle $\phi_2$ with respect to the normal $Y_{+45z}$ axis. Accordingly, the reflected angle of the data beam 31-2 is also at an angle $\phi_2$ with respect to the normal axis $Y_{+45z}$. The angle between the incident data beam 31-1 and the reflected data beam 31-2 is $2\phi_2$. In the embodiment described, $\phi_2$ is 13° and hence $2\phi_2$ is 26°. The same condition applies for the right wall detector, that is, the reflected data beam 32-2 is 26° from the incident data beam 32-1.

While a preferred embodiment has the incident light beams along the $Y_{+58z}$ and $Y_{-58z}$ axes with the reflected light beams along the $Y_{+32z}$ and $Y_{-32z}$ axes, the angles and the sources and sensors may be interchanged in an alternate embodiment. With such an embodiment, the incident light beams are at $Y_{+32z}$ and $Y_{-32zy}$ and the reflected beams are at $Y_{+58z}$ and $Y_{-58z}$, respectively.

In FIG. 3, the dual source 43-1 also provides an incident tracking beam 31,-1 and a reflected tracking beam 31'-2. The dual sensor 40-1, in one embodiment, includes a single time-multiplexed position sensing device (PSD), although a separate sensor for the reflected data beam 31-2 and a separate sensor for the reflected tracking beam 31'-2 can be employed.

In a similar manner, the right wall dual source 43-2 provides an incident tracking beam, 32'-1, onto the right wall 26 and provides a reflected tracking beam 32'-2 to the dual sensor 40-2. The dual sensor 40-2 is like the dual sensor 40-1.

Figure 4:
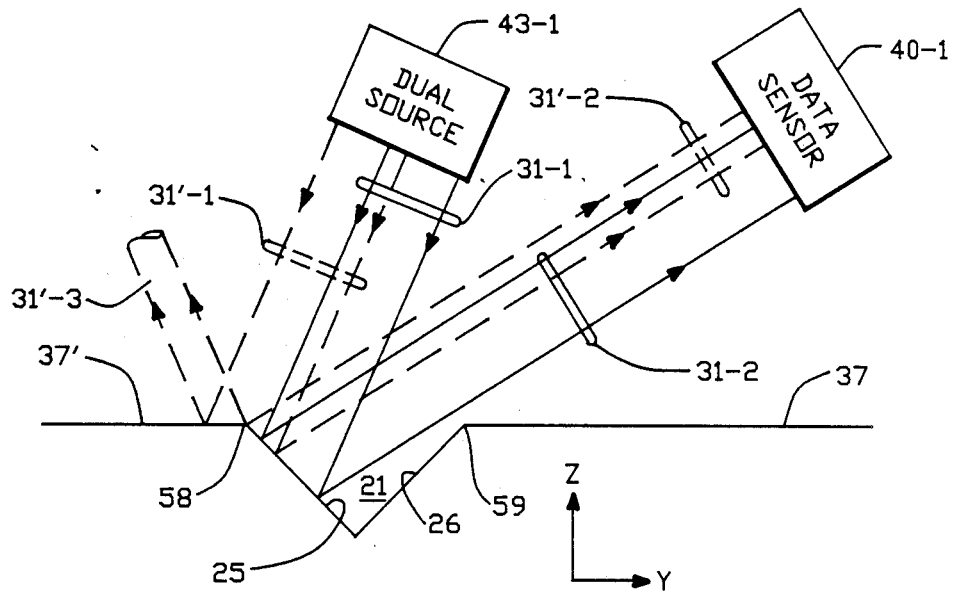
FIG. 4 depicts a schematic cross-sectional view of a groove section and the left wall detector including a dual source and dual sensors for data extraction and tracking.

In FIG. 4, further details of the left wall components of the FIG. 3 embodiment are described. Although not shown in FIG. 4, a mirror image right wall detector and beams are also present as described in FIG. 3. In FIG. 4, the dual source 43-1 provides the data beam 31-1 which impinges entirely on the face 25 of the left wall of the groove. The reflected data beam 31-2 impinges and forms a spot on the data sensor 40-1. Similarly, the dual source 43-1 provides the incident tracking beam 31'-1 which impinges both on the left wall 25 and on the left land 37, The portion of the incident tracking beam 31'-1 which hits the wall 25 is reflected as the reflected tracking beam 31'-2 which is incident to form a spot on dual tracking sensor 40-1. The size of the tracking spot on the sensor 40-1 is proportional to that portion of the impinging tracking beam 31'-1 that hits the surface of the left wall 25. That portion of the incident beam which impinges on the left land 37, is reflected in a reflected beam 31'-3 which is not directed toward the sensor 40-1. The reflected beam 31,-3 from the left land 37' in FIG. 4 is directed back into the right dual source 43-2 (not shown in FIG. 4) as shown in FIG. 3.

In a similar manner, the right wall detector, including the dual source 43-1 and dual sensor 40-1 of FIG. 3 appear with the mirror image relationship of FIG. 4. For the right wall detector, the tracking beam which impinges on the right land 37 has a reflected beam component (32'-3 not shown) which is directed back into the left wall source 43-1 as shown in FIG. 3.

In FIG. 5, a dual sensor 40-1 is positioned to receive the reflected data beam 31-2 and the reflected tracking beam 31'-2 from the left wall 25 of groove 21. The light rays of data beam 31-1 from the source 43-1 are incident upon the left wall 25 of the groove 21 at the spot center 51. The spot center 51 is within the sensing region 15 (see FIGS. 1 and 2). The reflected rays 31-2 are incident on the sensor 40-1 at spot center 39 of spot 44.

In FIG. 5, the dual source 43-1 also provides the incident tracking beam 31'-1 which impinges upon both the left wall 25 of the groove 21 and the left land 37'in the manner previously described in connection with FIG. 4. The outputs from the sensor 40-1, during the tracking mode, are proportional to the intensity (size of the cross-sectional area of the beam 31'-2) of the spot incident on the detector 40-1.

In FIG. 5, the sensor 40-1 is a conventional position sensing device (PSD) which is time-multiplexed to provide data and tracking information. Sensor 40-1 has output lines 54 which include a first output line 54-1 and a second output line 54-2. The current on each of the lines 54-1 and 54-2 is proportional to the intensity of the incident spot 44 and the closeness of the spot center 39 to the X-axis ends 45-1 or 45-2, respectively, of sensor 40-1. With the spot 44 positioned as shown in FIG. 5, the current, $I_2(t)$, in line 54-2 is greater than the current, $I_1(t)$, in line 54-1. The sum of the currents, $I_1(t) + I_2(t)$, is proportional to the intensity of spot 44 at any time, t, while the difference of the currents, $I_1(t) - I_2(t)$, is proportional to the position of spot center 39 at any time, t, along the X axis relative to the center point, $S_2$.

As hereinafter described, the output currents $I_1(t)$ and $I_2(t)$ are converted to voltages $V_1(t)$ and $V_2(t)$ and processed to form a sum signal, $V_1(t) + V_2(t)$, proportional to the intensity the incident spot 44 and to form a difference signal, $V_1(t) V_2(t)$, proportional to the position of spot center 39. The sum and difference signals are further processed by the division $[V_1(t) - V_2(t)]/[V_1(t) + V_2(t)]$, to form the processed sensor output signal, V(t), which is independent of spot intensity and is strictly a function of spot position on the PSD 40-1.

The angle of reflection between the incident rays 31-1 and the reflected rays 31-2 is $2\phi(t)$. The angle $\phi(t)$ changes as a function of the angle of the groove wall 25 at the spot center of incidence 51. As the record 10 is moved, essentially in the X-axis direction with time, t, the spot center 39 of the rays 31-2 on the sensor 40-1 moves in the X-axis direction. Therefore, the displacement, d(t), of the spot center 39 along the sensor 40-1 varies as the angle $2\theta(t)$. The output signal on the lines 54 from sensor 40-i is proportional to the displacement, d(t), which in turn is proportional to the angle $2\theta(t)$.

The recorded data encoded for each channel is the signal velocity, $V_s(t)$, of each of the respective groove walls, that is, the change in the $Y_{+45}$-axis and $Y_{-45}$-axis dimensions, $dy_{+45}$ and $dy_{-45}$, with respect to time, dt, for the left and right groove walls for the groove section within the sensing region 15. The changes for the left wall 25 are along the $Y_{+45z}$-axis while the changes for the right wall 26 are along the $Y_{-45z}$-axis. However, the sensing for the left wall 25 and right wall 26 are actually made along the $Y_{+32z}$ and $Y_{-32z}$ axes, respectively. In addition, a tangential velocity, $V_T(t)$, exists due to the constant rotation rate, $\omega$, and the radial position, $R_y(t)$, of the groove section of interest. The tangential velocity is a change in the X-axis dimension, dx, as a function of time, dt.

In an embodiment of the present invention, an optical sensor 40-1 is placed parallel with the X-axis and so as to receive the reflected rays along a $Y_{+32z}$ plane. The displacements of the incident spots along the X-axis in the $Y_{+32z}$ plane are a measure of twice the groove wall angle $\theta(t)$ which varies as a function of time.

Data Extraction

The signal velocity, $V_s(t)$, ranges as follows:

$$0 < v_2(t) < 15 \text{ (cm/sec)} \quad (1)$$

Using Eq. (1), the tangential velocity, $V_T(t)$, is determined as follows:

$$\begin{aligned} V_T(t) &= \omega * R_y(t) && \text{Eq. (2)} \\ &= 33.3/60 * 2\pi * R_y(t) \\ &\quad 3.49 * R_y(t) \end{aligned}$$

where, $R_y(t)$ = the radial distance at any time t of the incident spot location as measured from the center of the record For a standard 12 inch format (LP), the play region radius, Ry(t), is bounded by an inner value of 5.85 cm and an outer value of 15 cm. Therefore, from Eq. (2), $V_T(t)$ ranges as follows:

$$20.4 < v_T(t) < 52 \text{ (cm/sec)} \quad (3)$$

The width, P, of the spot 50 (see FIG. 7) in the X-axis dimension must be small compared with the wavelength $\lambda$ of the signal being detected to preserve proper signal bandwidth where $\lambda = V_T(t)/f_s$ and where $f_s$ is the frequency of the signal being detected.

The incident spot 50 has a Gaussian distribution where P is the $1/e^2$ width. For a width, P, equal to 6 micrometers, the data signal rolloff at 20KHz is $-3.5$db due to the spot size relative to the data signal wavelength, $\lambda$, on the records at the inner radius of 5.8 centimeters. For a spot width of 1 micrometer, the signal at 20 KHz has no measurable rolloff. For a spot width of 10 micrometers, a $-15$db 20KHz rolloff is observed. For widths up to P equal to 12 micrometers, the rolloff equals or exceeds that obtainable by conventional methods such as a mechanical stylus. For high performance operation P can range from 3 to 12 micrometers. The depth of field of the lines is proportional to the square of the spot size.

Therefore, for good frequency response the spot width, P, is as small as possible while for greater depth of field the spot width, P, should be as large as possible. A spot width of 6 micrometer has been found to be a good compromise between depth of field and frequency response.

The spot length, Q, measured in the $Y_{-45z}$ dimension is typically 22 micrometers.

The groove wall angle $\theta(t)$ is computed $$\begin{aligned} \theta(t) &= \tan^{-1}[dy/dx] && \text{Eq. (4)} \\ &= \tan^{-1}[dy/dt/dx/dt] \\ &= \tan^{-1}[V_s/V_T] \end{aligned}$$

where: $dy/dt = V_s(t)$ = signal velocity

-continued $dx/dt = V_T(t)$ = tangential velocity $dy = dy_{+45}$ or $dy_{-45}$ = wall movement $$\theta(t) = \tan^{-1}[V_s(t)/V_T(t)] \quad (5)$$

A position sensing detector (PSD), sensor 40-1 in FIG. 5, is used to sense the dynamically changing specular beam reflection angle, $2\theta(t)$, of reflected light in the data beam 31-2 from the groove wall 25. This sensor 40-1 generates currents I(t) on lines 54 which are converted to voltages, V(t), corresponding to the location of the center 39 and the size of the light spot 44 incident on the sensor 40-1 surface and resulting from the reflected light 31-2.

Sensor 40-1 is oriented to measure the position of spot 44 formed by the reflected beam 31-2 at the reflected angle $2\theta(t)$. Sensor 40-1 measures the position of spot 44 in the tangential (X-axis) direction. Such measurement is proportional to the lateral (Y-axis) motion of the groove wall 25.

The sensor 40-1 offers a greater than four decade dynamic range, low cost and the ability to sense the center of a light spot area and therefore has no significant sensitivity to the spot non-uniformity.

Assuming ideal conditions, $$\begin{aligned} V(t) &= C * d(t) && \text{Eq. (6)} \\ &= C * [h(t) * \tan 2\theta(t)] \end{aligned}$$

where, $C$ = arbitrary constant (volts/mm)

$h(t)$ = distance of PSD from groove wall (mm)

$d(t)$ = displacement from reference of light incident spot (mm)

$V(t)$ = processed sensor output signal.

In terms of the encoded velocity, the data output signal, V(t), of the data extraction method is as follows:

$$V(t) = C * h(t) \tan[2 \tan^{-1}(V_s(t)/V_T(t))] \quad (7)$$

For small values of an angle, the following equations apply:

$$\tan^{-1}[\alpha] \approx [\alpha] \quad (8)$$

$$\tan^2[\alpha] \approx 0 \quad (9)$$

$$\begin{aligned} \tan[2\alpha] &= 2\tan[\alpha/[1-\tan^2(\alpha)]] && \text{Eq. (10)}\\ &\quad 2\tan[\alpha] \\ &\quad 2\alpha. \end{aligned}$$

Using Eqs. (8-10) for the small angle, $V_s(t)/V_T(t)$, Eq. 7 becomes $$V(t) \approx C * h(t) * [2V_s(t)/V_T(t)]. \quad (11)$$

The harmonic distortion resulting from the assumptions of Eqs. (8-10) for a typical worst-case scenario (at the inner radius and high groove velocity) is only measurable as third order distortion and is quite small ($-33$dB).

In order to render the signal V(t) independent of the radius, $R_y(t)$, V(t) is multiplied by $R_y(t)$ to form the signal $V(t)_R$ as follows:

$$V(t)_R = [V(t)][R_y(t)]. \quad (12)$$

Sources of Error For Data Extraction

There are several error conditions which potentially can affect the data extraction method. Each of these conditions is analyzed to determine its noise contribution.

While the preferred embodiment utilizes the data sensor oriented in the tangential (X-axis) direction, a laterally (Y-axis) oriented sensor can be employed. For example, the detector 40-1 can be rotated 90° in the FIG. 5 plane to sense the $Y_{-58z}$-axis variations in the position of spot center points $P_{1,2}$, and $P_{1,3}$. In this alternate embodiment like the preferred embodiment, the reflected beam from the groove wall forms a spot at a spot position proportional to the recorded signal. The sensor 40-1 senses the spot position of the reflected spot thereby tracking the wall modulation.

The absence of vertical tracking-angle distortion can be understood referring to FIG. 7. In FIG. 7, the left wall 25 of the groove 21 is shown where the left wall spot $50_1$ is located with a center 51 which corresponds to one Y-axis coordinate. The actual recorded angle at 15° (along axis $X_{-75z}$) indicates that a portion of the spot $50_1$ has a coordinate which is forward in the X-axis direction of the coordinate of the center 51 and a portion of spot 50 that has a coordinate which lags behind the coordinates of the center 51. The lead coordinate tends to cancel the lag coordinate. Since the lead and lag tend to cancel, the coordinate at the center point 51 tends to be the average of all the leading and lagging coordinates. For this reason, the vertical cutting angle can be ignored.

Pits and Scratches

In FIG. 7, the incident light spot $50_1$ from the light data beam rays 31-1 is shown on the portion of the left wall 25 of the groove section 21. The spot $50_1$ is located above the location in which the pits and scratches 46 are typically present within the groove and along wall 25. The pits and scratches are the result of wear caused by use of a mechanical stylus and/or are caused by the residue left in the bottom of the groove as a result of the manufacturing process. Because the spot 50 is incident generally above the pits and scratches, the present invention is immune from any adverse effects which they would cause when a mechanical stylus is employed.

Lateral Tracking (FIGS. 8–13)

The groove tracking system keeps the data (audio extraction) beams 31-1 and 32-1 (see FIG. 3) following the groove wall just below the land/groove interfaces 58 and 59 (see FIG. 5). The data beam is preferably located so that the data beams reflected from the groove walls to the PSD data sensors are as constant as possible by avoiding the land/groove interfaces 58 and 59 which frequently have vinyl deformations. The embodiment described has an independent set of laser beams both for tracking and for data extraction. The optical system that has been found to provide optimum tracking consists of a pair of laser beams from separate lasers, each being focussed on the same groove wall. The tracking beams 31'-1 and 32'-1 are produced by the tracking laser; the data beams 31-1 and 32-1 are produced by the data laser. Two laser beams 31-1 and 31'-1 (or 32-1 and 32'-1) are merged by a beam combiner (beam splitter) such that they are approximately parallel to each other and coincident. After the beam combiner, each beam pair reflects off from a servo controlled scanner mirror, through the focusing objective lens, and onto the groove wall. The two beams 31-1 and 31'-1 (or 32-1 and 32'-1) are non-parallel by about 0.026 degrees in the crosstrack direction going into the focusing lens. This angle separates the two focused spots ($50_1$ and $50'1$ in FIG. 7) on the groove wall and land by approximately 15um. The tracking beams 31'-1 and 32'-1 follow the tops of the groove walls at the groove-land interfaces 58 and 59 and the data beams 31-1 and 32-1 follow about 15um below. Both of the reflected beams 31-2 and 31'-2 hit the PSD sensors with nearly identical geometries.

The two lasers for dual sources 43-1 and 43-2 are time-multiplexed so that the tracking laser is on when the data laser is off and visa verse. The two lasers are both clocked at 50% duty cycle. The outputs of the PSD sensors 40-1 and 40-2 are sampled and demultiplexed into the tracking signals and the data signals. The demultiplexing is controlled by the same clock that controls the laser switching. The demultiplexed outputs are low-pass filtered to reconstruct the analog tracking and data signals.

Each beam pair 31-1 and 31'-1 (or 32-1 and 32'-1) is moved by a scanner mirror in a servo system that keeps the total collected light power from the reflected tracking beam 31'-2 (or 32'-2) at half of its possible peak level. This operation keeps each tracking beam 31'-1 and 32'-1 half in the groove and half on the lands 37 above the groove wall. The data beam is then automatically kept near the top of the groove wall, as shown by spot $50_1$ in FIG. 7, for optimum audio playback. The audio signal is derived from the PSD position output from the data phase of the demultiplexed PSD sensor 40-1 (or 40-2) output.

The light source used by this system is typically a semiconductor laser diode. The laser beam emitted by the laser diode chip is diverging with different diverging angles horizontally and vertically. Most of the emerging beam is collected into an elliptical collimated beam by a collimating lens. A "collimated" beam is one in which the cross-sectional geometry remains approximately the same along the optical axis for the beam length used in the system. The beam has a spatial intensity profile that is roughly Gaussian. The beam width is defined as the width where the beam intensity falls to $1/e^2$ (13.5%) of the peak intensity level at the center of the beam. The elliptical beam 31-1 has collimated beam size of roughly 2.2mm × 6mm.

This collimated beam is focused onto the groove wall by a focusing objective lens. The focused spot intensity profile is the spatial two dimensional Fourier transform of the intensity profile of the collimated beam. The spot size is defined by the $1/e^2$ intensity width similar to the collimated beam. A 30mm focal length focusing lens produces a focused spot (for example, $50_1$ in FIG. 7) on the record that is roughly 22um × 6 um. The wide dimension of the collimated beam focuses into the narrow dimension of the focused spot.

Figure 21:
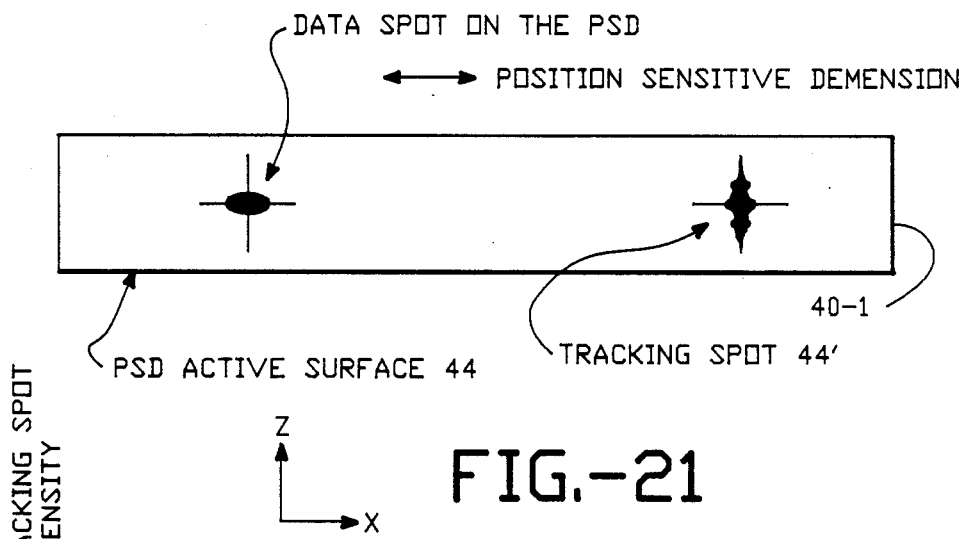
FIG. 21 depicts the shapes of the data and tracking spots on a sensor.

The beam reflected off from the groove wall (for example, 31-2) is intersected by and forms a light spot on the PSD sensor 40-1. Referring to FIG. 21, the spot shape on the PSD is approximately the Fraunhoffer diffraction pattern of the spot shape leaving the groove. The Fraunhoffer diffraction pattern is described by the spatial two dimensional Fourier transform of the focused spot intensity profile. The tracking system is designed to keep the data beam, riding a fixed distance below the data beam, hitting the groove wall such that it will leave the groove untruncated by the edges of the groove. The data spot on the PSD will be a small spot with a Gaussian intensity profile. The tracking system forces the tracking beam half onto the land above the wall and half on the wall; the half hitting the groove wall will reflect back to the PSD.

The intrack dimension (along the groove) of the tracking spot is unimpeded and will reflect out of the groove to form a spot on the PSD sensor 40-1 that has a Gaussian intensity profile horizontally (the position sensitive dimension of the PSD). In the crosstrack dimension (up and down the groove wall), the focused spot will be truncated at the middle of the spot, as shown and described in connection with FIGS. 8 through 13. The vertical dimension of the tracking spot hitting the PSD sensor 40-1 is smeared and contains side-lobes as described by the Fourier transform of the truncated Gaussian intensity profile.

The PSD sensor 40-1 produces a current out of each end dependent on the intensity and position of the beam hitting the sensor. The beam forming the spot on sensor 40-1 is defined by a collection of individual light rays each with an intensity of I(jx,jz) where (jx,jz) is the location that the ray hits the PSD sensor 40-1; the X dimension is the position sensitive dimension. The output, Xo, of the PSD sensor 40-1 is determined by the center of intensity of all of the rays hitting the sensor (the centroid of the spot on the PSD sensor) as follows:

$$Xo = \sum_{jx=-\infty}^{\infty} \left[ \left( \sum_{jz=-\infty}^{\infty} I(jx,jz) \right) \cdot X(jx) \right]$$

where X(jx) is the X location of the (jx,jz) light ray.

While the tracking beam shape on the PSD sensor 40-1 is corrupted in the vertical, Z, dimension by the beam truncation, the centroid of the beam in the sensitive, X, dimension of the PSD sensor 40-1 is unchanged from the untruncated case. The total intensity of the tracking beam 31'-2 is half of that from an untruncated beam.

On brief passages, less than 25um, of some records, the vinyl is damaged to form a groove wall surface that resembles sandpaper. This sandpaper scatters the incident beam in all dimensions. The spot hitting the PSD sensor 40-1 reflected off from a sandpaper region will be reduced significantly in intensity and will have a centroid location on the PSD sensor 40-1 that can be significantly different from the centroid reflected off from a smooth, non-sandpaper groove wall. This non-smooth sandpaper effect causes a short term drop out (less than 15usec) in the tracking signal. Due to the relatively low tracking bandwidth, the short signal dropouts are filtered (integrated) out of the tracking signal. The tracking system is insensitive to short term signal dropouts.

In the intrack direction, the focused data spot is kept small enough to faithfully reproduce the shortest signal wavelengths (highest frequencies) on the record. The spot needs to be large enough to provide enough depth of focus to allow the beam to stay in focus as the groove wall moves around. Crosstrack, the beam needs to be small enough to keep the beam fitting in the narrow grooves and large enough to average out as much of the vinyl wall surface as possible. A data spot found acceptable is approximately 6um intrack by 22um crosstrack.

Figure 22:
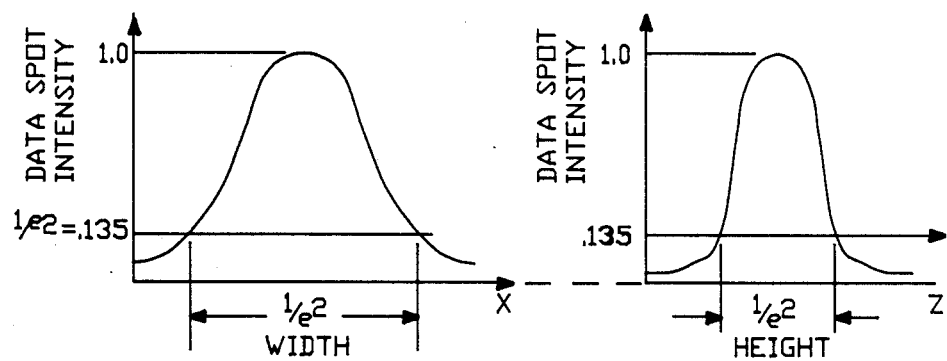
FIG. 22 depicts the intensity distribution of the data light beams incident on the sensors.
Figure 23:
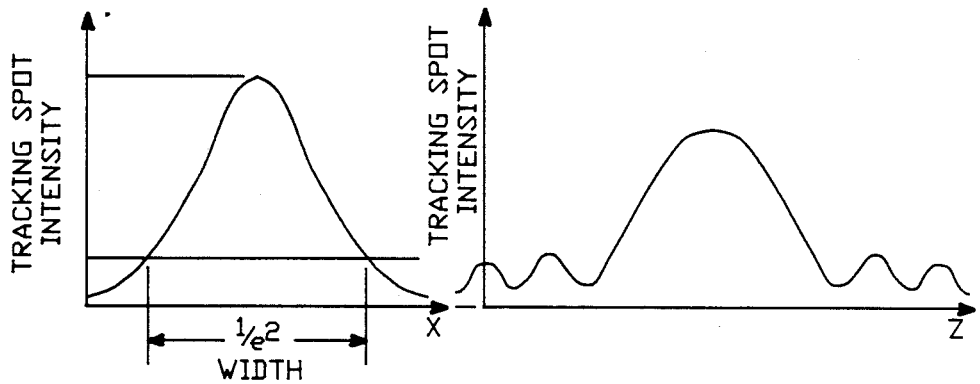
FIG. 23 depicts the intensity distribution of the tracking light beams incident on the sensors.

The intrack direction requirements for the focused tracking spot geometry is to keep the spot small enough to provide at least 5KHz of tracking information and to keep the spot as large as possible to average out as much wall and land/groove interface region as possible. Crosstrack the spot needs to be small enough to fit in the groove and not to give crosstalk between adjacent grooves when there is no land. With the incident beam hitting the record at an angle above normal to the groove wall, there is a dead zone between the adjacent grooves. Referring to FIG. 22, the tracking spot needs to be as large as possible crosstrack to give as much lateral tracking range as possible. A tracking spot found acceptable is the same 22um by 6um size as the data beam. A 20um round spot is more optimum, however, the laser diodes being used produce elliptical spots which are acceptable in order to keep the design simple.

As described in the cross-referenced application, the reflected spot sweeps back and forth in an arc (see FIG. 6) on the PSD sensor as the groove wall angle changes with signal modulation. The beam paints out an arc on the PSD sensor due to the fact that the incident beam is not in the plane containing the wall normal vector as the wall changes angle. This arc will be a flat line for an incident (and reflected) beam normal to the nominal groove wall which would be an incident beam at 45 degrees above the horizontal plane of the record. As the incident beam angle departs from the wall normal, the arc gets more severe. This arc requires the PSD sensor 40-1 to be larger to collect the light and the arc makes it more difficult for the reflected beam to get out of the groove without being truncated by the opposite groove wall.

In order to reduce the problems of the arc, the beam angle 58 degrees was found to be superior to 60 degrees. Ideally, an incident beam angle of 45 degrees would be selected, however, this is not a practical configuration since the incident beam would have to pass through the PSD sensor. A 52 degree system works poorly because the incident beam barely hits the bottom of the PSD. The 58 degree system has been found optimum with sensor/package technology available today.

The entire optical system uses two lasers. The data laser is split into two equal power beams to provide the left and right data light beams. About 10% of the tracking laser power is split off to provide the height sensor light beam as described in the cross-referenced patent application. The remainder of the tracking laser beam is split into two equal power beams to provide the left and right tracking light beams. The data laser beam is sent into one face of a cube beam splitter and the tracking beam is sent into an orthogonal face of the cube splitter. Half of each beam emerges from the two other splitter faces orthogonal to each other; the beam pair from one face are the right channel data and tracking beams and the pair from the other face are the left channel beams.

The optical configuration used in the preferred embodiment permits the adjustment of the tracking beam, before the cube splitter, to adjust the relative tracking-/data spot geometry on the groove wall. The optical system provides that whatever tracking/data spot geometry exists for one channel will be identical for the other channel.

The lateral tracking unit 30 of FIG. 1 utilizes the left wall detector 13-1-1 and the right wall detector 13-2 in combination for detecting the position of and for the dynamic positioning of the assembly 9 of FIG. 1 in the Y-axis direction. The unit 30 tracks a groove which changes width, $g_w$, by a large amount (0 micrometers to 150 micrometers) and travels over the full radius, $R_y(t)$, of the record 10.

Figure 8:
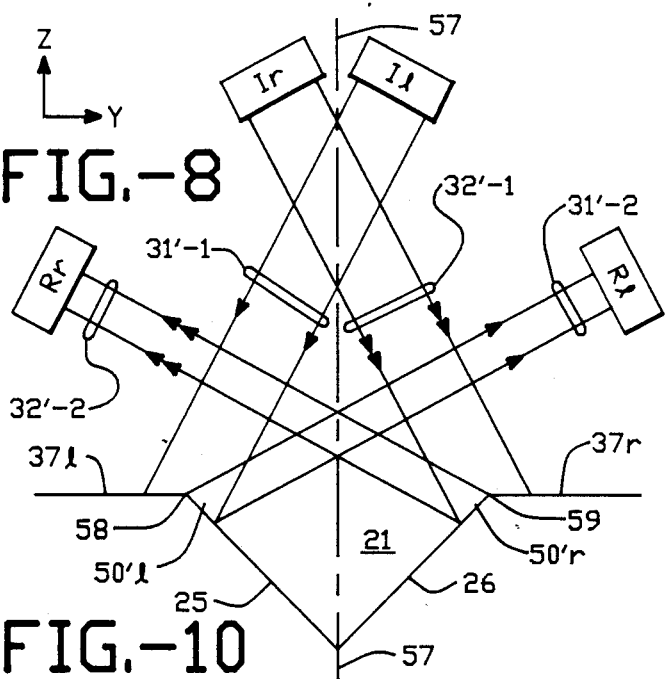
FIG. 8 depicts left and right wall tracking detectors positioned symmetrically above the left and right walls of a groove section together with the incident and reflected tracking beams.

In FIG. 8, the groove section 21 with the left side wall 25 and the right side wall 26 is shown. The incident tracking rays 31'-1 have a cross-sectional dimension, $I_1$, which forms the spot 50 of a given area partially on the left wall 25 and partially on the left land 37$_1$. The angle of incidence of the rays 31'-1 is 58° so that the reflected tracking rays 3I'-2 change in area as a function of the portion of the spot 50, which is below the intersection of the land 37$_1$ and the left wall 25. If the left wall 25 is translated in the positive Y-axis direction, then less of the light reflected from the left wall 25 will be reflected by the wall 25 and vice versa. The cross-sectional dimension, $R_1$, represents the reflected component 31'-2 of the incident rays 31'-1 that are incident on the sensor 40-1.

In a similar manner, the incident rays 32'-1 have a cross-sectional dimension, $I_r$, which are incident upon the right wall 26. The component of the incident beam 32'-1 forming the reflected rays 32'-2 have a cross-sectional dimension, $R_r$, on sensor 40-2 as a function of the amount of rays that are reflected by the right wall 26.

Figure 9:
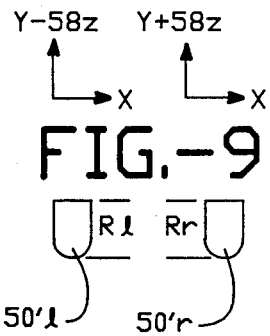
FIG. 9 depicts the reflected portion of the light spots from the orientation of FIG. 8.

In FIG. 9, an $XY_{-58z}$ view for the left wall and an $XY_{+58z}$ view for the right wall images of the spots formed by the reflected beams 31'-2 and 32'-2 of FIG. 8 are shown. Because the left wall 25 and the right wall 26 are symmetrically disposed with respect to the light source axis 57 between incident rays 3I'-1 and 32'-1, the heights and areas of the spots 50$_1$ and 50$_r$ are equal. That is, $R_1$ and $R_r$ are equal.

Figure 10:
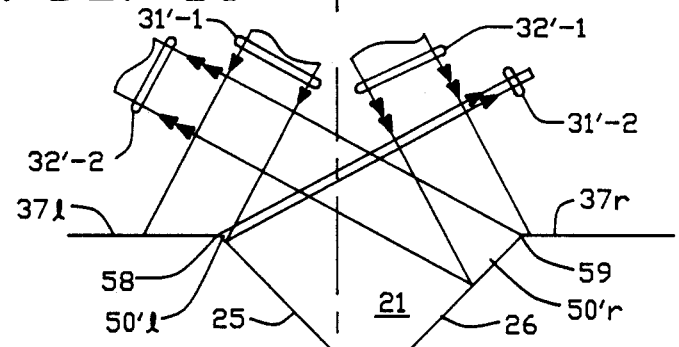
FIG. 10 depicts the groove section 21 moved in the Y-axis direction relative to the incident light rays of FIG. 9.

In FIG. 10, the groove 21, and its center axis 47, have been shifted in the positive Y-axis direction relative to the light source axis 57 while the incident rays 31,-1 and 32'-1 are the same as in FIG. 8. In FIG. 10, the cross-sectional dimension of the left wall reflected rays 31'-2 is $R_1$ and is less than the cross-sectional dimension $R_r$ of the reflected rays 32'-2 because a greater portion of the incident rays 32'-1 are reflected by wall 26. The position of the light source axis 57 is designated $P_c(t)_y$ and the position of the groove axis 47 is designated $P_g(t)_y$.

Figure 11:
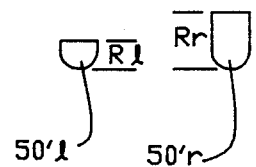
FIG. 11 depicts the reflected portion of the light spots from the orientation of FIG. 10.

In FIG. 11, the different $R_1$ and $R_r$ dimensions for the reflected rays of FIG. 10 are shown.

Figure 12:
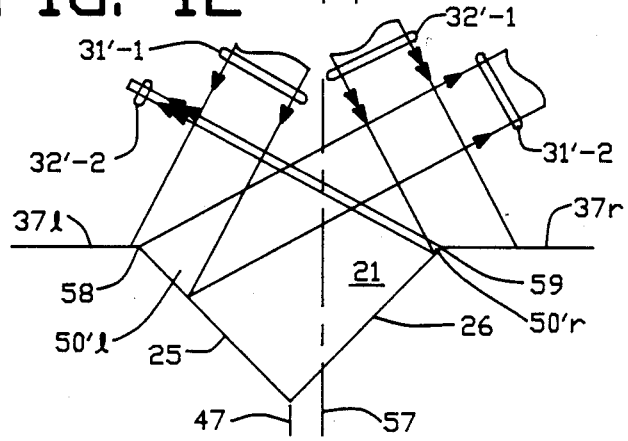
FIG. 12 depicts the light rays relative to the groove section 21 of FIG. 8 moved in the opposite direction relative to the groove section in FIG. 10.

In FIG. 12, the groove 21 and axis 47 have been shifted in the negative Y-axis direction relative to light source axis 57 and the position in FIG. 8. With this shift, $R_r$ is much smaller than $R_1$.

Figure 13:
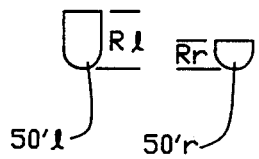
FIG. 13 depicts the reflected portion of the light spots from the orientation of FIG. 12.

In FIG. 13, the different $R_1$ and $R_r$ dimensions for the reflected spots 50$_1$ and 50$_r$ of FIG. 12 are shown.

Referring to FIGS. 8 through 13, it is apparent that the relative magnitude of the $R_1$ and $R_r$ dimensions of the reflected tracking spots is a measure of the centering of the groove section 21 designated by axis 47 with respect to the center axis 57 of the incident rays 31'-1 and 32'-1. The sensor 40-1 provides signals on lines 54 which are proportional to the cross-sectional area of the incident input rays. In a similar manner the sensor 40-2 provides signals on lines 53 proportional to the cross-sectional area of the incident rays 32-2. Therefore, the signals on lines 53 and 54 are proportional to the dimensions $R_r$ and $R_1$.

Lateral Tracking Assembly.

Figure 14:
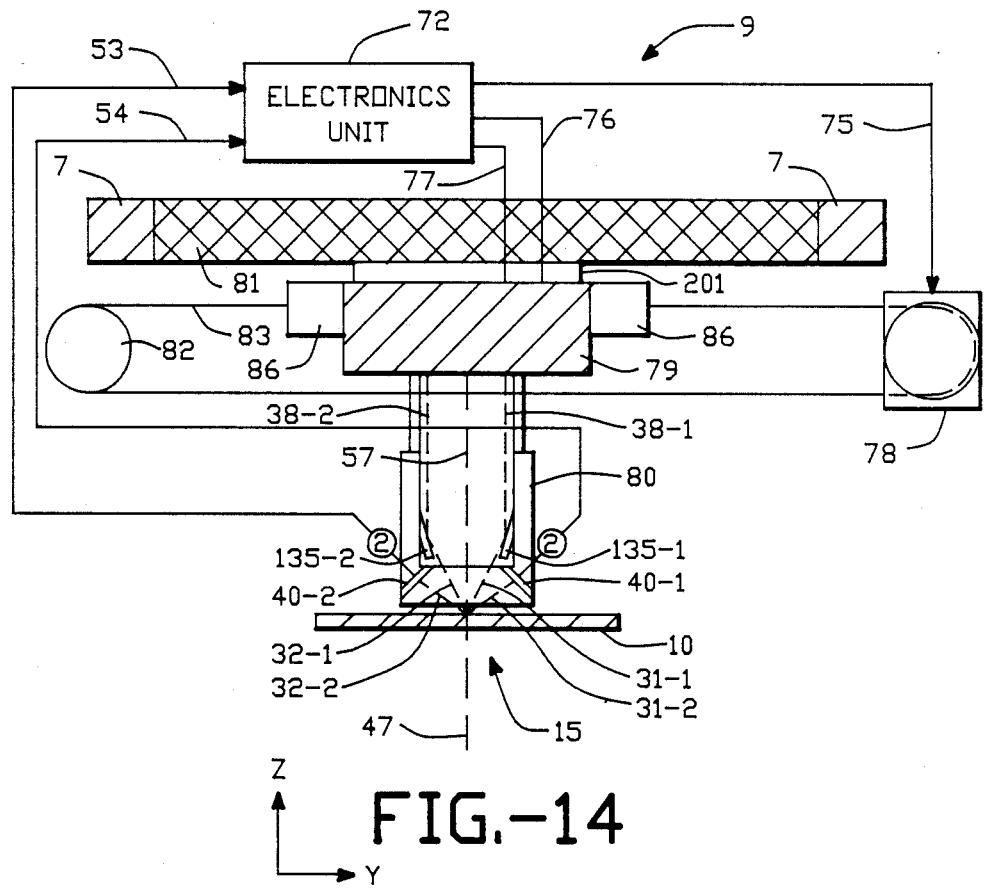
FIG. 14 depicts a YZ-plane schematic representation of the tracking assembly of FIG. 1 as positioned above a phonograph record.

In FIG. 14, further details of the lateral unit 30 of FIG. 1 are shown. The unit 30 includes a track unit 81 which is rigidly attached to the frame 7. The track unit 81 supports a sliding carriage 86 which is rigidly attached to the first optical assembly 79 so as to enable the carriage 86 and assembly 79 to translate in the Y-axis direction. The optical assembly 79 and carriage 86 are attached by two rails 201 and 202 (see FIG. 15). The carriage 86 is translated in the Y-axis direction by means of the drive cable 83. The cable 83 connects to carriage 86, extends around pulley 82 and is driven by the motor 78. Alternatively, a rack and pinion drive can be employed. The motor 78, typically a digitally commanded stepping motor, at any time, t, receives a Y-axis carriage positional command, $V_c(t)_y$, on lines 75 from the electronics unit 72. The commands from the electronics unit 72 specify a Y-axis position, $P_c(t)_y$, along axis 57 for the carriage 86 and attempt to position axis 57 over the center of the groove section, $P_g(t)_y$, along axis 47 as shown in FIGS. 8 through 13.

In FIG. 14, electronics unit 72 also provides control signals on lines 76 and 77 for controlling X-axis and Y-axis scanners within the optical assembly 79. The assembly 79 moves only in the Y-axis direction and is fixed in the Z-axis direction. The second optical assembly 80 is attached to the first optical assembly 79 by movable shafts 85 (see FIG. 15) so that the assemblies 79 and 80 translate together in the Y-axis direction by movement of carriage 86. The second assembly 80 is movable in the Z-axis direction by the solenoid shafts 85. Light from the first optical assembly 79 designated by rays 38-1 is reflected in a mirror 135-1 to form the left wall incident beam 31-1. Similarly, the incident rays 38-2 are reflected by a mirror 135-2 to form the right wall incident rays 32-1. The incident rays 31-1 are reflected as the rays 31-2 to the sensor 40-1. Similarly, the incident rays 32-1 are reflected as the rays 32-2 to the sensor 40-2. The sensors 40-1 and 40-2 provide the output signals on lines 54 and 53, respectively, which are in turn provided as inputs to the electronics unit 72.

The stepping motor 78, the sensors 40-1 and 40-2, the carriage 86, the optical unit including the optical assemblies 79 and 80, and the electronics unit 72 provide a carriage servo loop for translating the carriage 86 to the Y-axis position (the incident light position, $P_c(t)_y$, along axis 57) commanded by the electronics unit 72. Any difference between the commanded position, $P_c(t)_y$, and the groove position, $P_g(t)_y$, is detected by the left and right wall sensors 40-1 and 40-2 in the manner described in connection with FIGS. 8 through 13.

A difference between the carriage position, $P_c(t)_y$, and the groove section position, $P_g(t)_y$, results in a Y-axis error signal, $V_{err}(t)_y$, in electronics unit 72. The error signal $V_{err}(t)_y$ is proportional to the difference between the positions $P_c(t)_y$ and $P_g(t)_y$

Vertical Tracking

Figure 15:
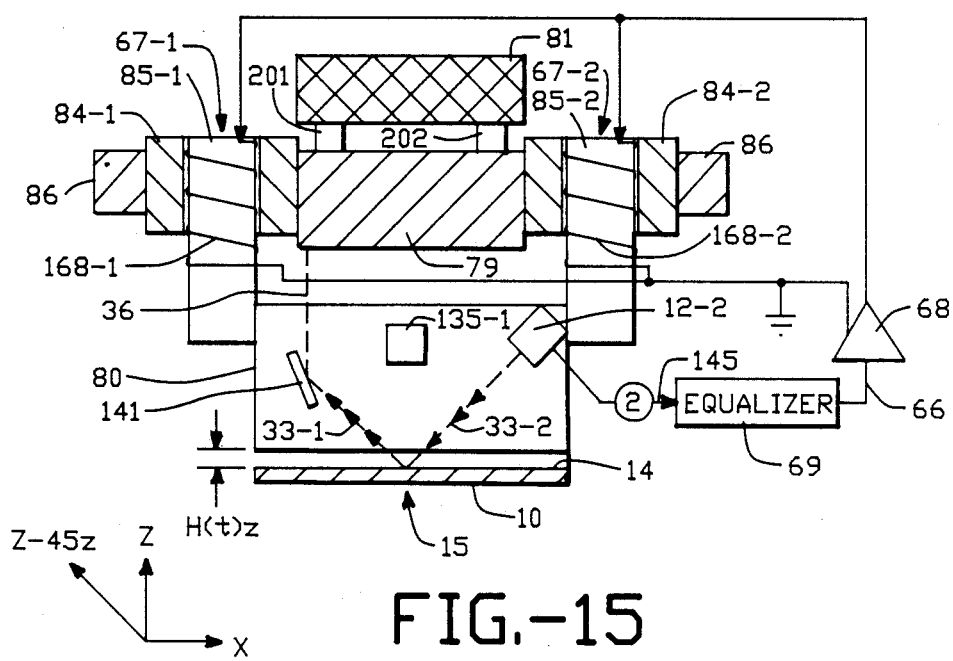
FIG. 15 depicts an XZ-plane schematic representation of the data and height tracking assembly of FIG. 1 and FIG. 24.

In FIG. 15, an XZ plane view of the assembly 9 of FIG. 14 is shown. The second optical assembly 80 is movable in the Z-axis direction relative to the first optical assembly 79. Optical assembly 80 is connected to the voice coil shafts 85-1 and 85-2. The shafts 85-1 and 85-2 are formed as non-magnetic cores that have electrical windings 168-1 and 168-2, respectively, driven by the amplifier 68. The shafts 85-1 and 85-2 are positioned within permanent magnets 84-1 and 84-2 which are rigidly attached to the carriage 86 and the optical assembly 79. The optical rays 36 from the optical assembly 79 are reflected by the mirror 141 so that the rays 33-1 are incident in the region of interest 15 on record 10. The reflected rays 33-2 are incident on the sensor 12-2. The sensor 12-2 provides an output on lines 145 which connect to the equalizer 69. The output from the equalizer 69 connects the line 66 to the amplifier 68.

The height $H(t)_z$ of the movable optical assembly 80 above the record 10 is controlled by the height servo loop consisting of the sensor 12-2, the equalizer 69, the amplifier 68, the voice coils 67-1 and 67-2, the first optical assembly 79 and the second optical assembly 80. The function of the height servo loop is to maintain the height of the second optical system 80 at a constant value above the surface 14 of record 10.

Sources of Tracking Errors

Since the vinyl record is a medium with difficult physical properties, there are several error sources which need to be evaluated for proper tracking. Included are such factors as record eccentricity, record ellipticity and land dropouts.

Electronics Unit

Figure 16:
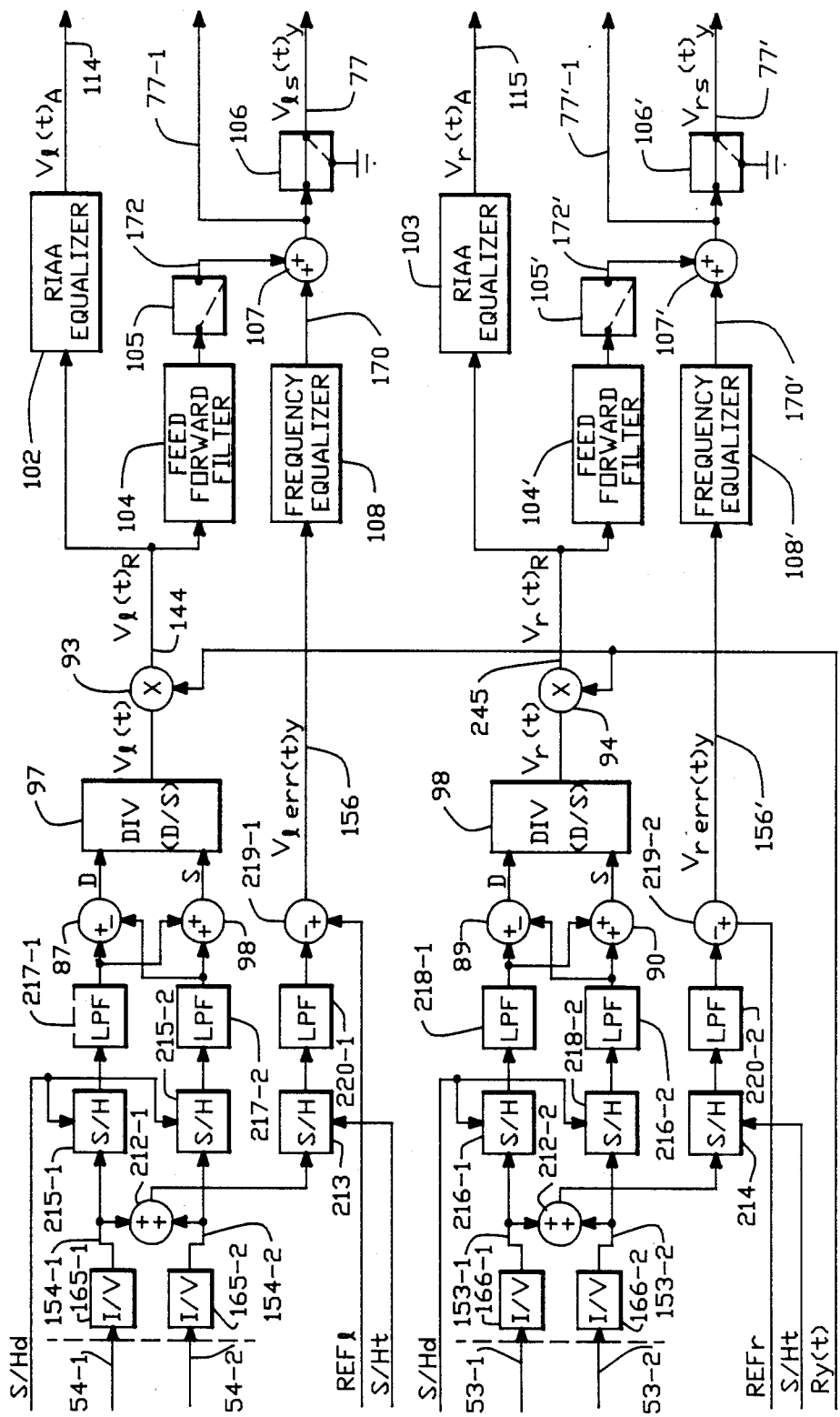
FIG. 16 depicts an electrical schematic representation of a portion of the electronics unit which forms part of the data and tracking assembly 24.
Figure 17:
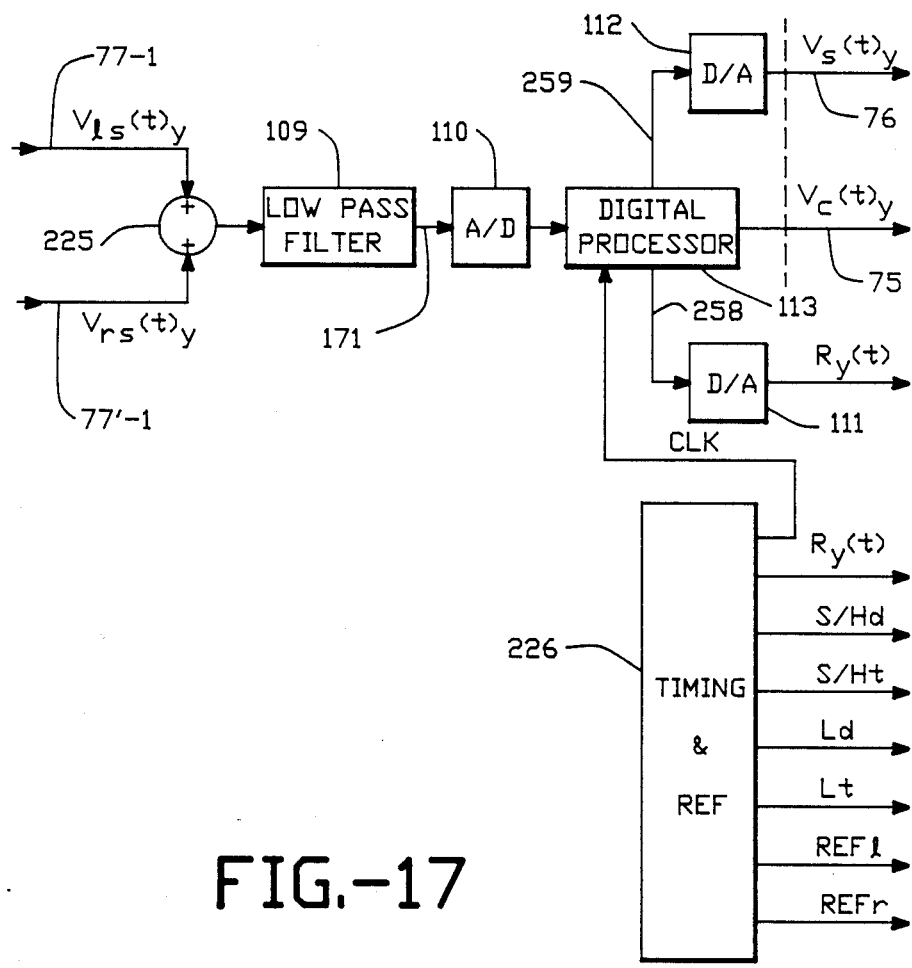
FIG. 17 depicts an electrical schematic representation of a portion of the electronics unit which forms part of the data and tracking assembly 24.

In FIGS. 16 and 17, further details of the electronics unit 72 of FIG. 14 are shown. The input lines 53 are the two lines from the right wall detector 40-2 of FIG. 14 and connect to current-to-voltage converters 166-1 and 166-2. From converter 166-1, one line 153-1 connects as an input to adder 212-2 and through a sample-and-hold unit 216-1 (S/H) and a lowpass filter 218-1 (LPF) as the plus input to a subtractor circuit 89 and as the plus input to an adder circuit 90. The other of the lines 153-2 connects as an input to adder 212-2 and through a sample-and-hold unit 216-2 (S/H) and a lowpass filter 218-2 (LPF) connects to the negative input of the subtractor 89 and the other positive input of the adder 90. Circuits 89 and 90 are conventional sum and difference circuits for analog signals.

The sum signal from the adder 212-2 connects through a sample-and-hold unit 214 (S/H) and a lowpass filter 220-2 (LPF) to the negative input of a subtractor 219-2. The positive input to the subtractor 219-2 is the REFr signal from the timing and reference circuit of FIG. 17. The output from subtractor 219-2 connects as an input to the frequency equalizer 108'.

The output signal, $V_{R1}$, from the sum circuit 90 is proportional to the intensity (and $R_1$) of the reflected beam 31-2 on the left wall sensor 40-1. The output signal from the difference circuit 89 is proportional to the position of the center 39 of the reflected beam 31-2 as measured along the X-axis in FIG. 5 and is intensity (area) dependent.

The sum signal, S, from the adder 90 and the difference signal, D, from the difference circuit 89 are input to the analog divider 98. The divider 98 divides the difference signal by the sum signal thereby providing a right wall output data signal, $V_r(t)$, proportional to the modulation of the right wall. The purpose of the divider 98 is to normalize the difference signal so that the output data signal is rendered independent of variations in intensity of the non-blocked component of the reflected beam. The output data signal from the divider 98 is given by Eq. (11) which for the right wall is denominated as $V_r(t)$.

The data signal for the right wall includes a term, $V_r(t)$, proportional as indicated in Eq. (2) to the radial position $R_y(t)$. The multiplier 94 multiplies the data signal $V_r(t)$ by $R_y(t)$ to form the data signal, $V_r(t)_R$, on line 245 which is independent of the radius, $R_y(t)$, at which the tracking assembly is positioned in accordance with Eq. (12). The data signal on line 145 is proportional to the right wall velocity in the $Y_{-45z}$-axis direction.

The data signal on line 245 from the multiplier 94 connects to the RIAA equalizer circuit 103 and provides the right wall audio signal, $V_r(t)_A$, on line 115.

The subtractor 219-2 provides the right wall error signal, $Vr\text{-}_{err}(t)_y$, on line 156,. The error signal on line 156' connects to the frequency equalizer 108' which provides the equalized signal on line 170'.

In FIG. 16, the data signal on line 345 representing the $Y_{+45z}$ axis wall velocity is input to the feedforward filter 104' as a right wall velocity signal, $Vr(t)_R$.

The right wall velocity signal, $Vr(t)_R$, on line 245 is processed in the feed forward filter 104' (ACcoupled integrator) and is connected through a switch 105' to the sum circuit 107'. The sum circuit 107' sums the integrated velocity signal from filter 104' with the equalized error signal from equalizer 108, and connects its sum output, through the switch 106, as the right scanner signal, $Vr_s(t)_y$, on line 77' for a scanner like the one in FIG. 19.

In FIG. 16, the left wall signals on lines 54-1 and 54-2 connect through converters 165-1 and 165-2 as inputs to adder 212-1. Converter 165-1 has one line 154-1 connected through a sample-and-hold unit 215-1 (S/H) and a lowpass filter 217-1 (LPF) connected as the positive input to the difference circuit 87 as a positive input to the sum circuit 88. The other signal from converter 165-2 on line 154-2 connects through a sample-and-hold unit 215-2 (S/H) and a lowpass filter 217-2 (LPF) as the negative input to the difference circuit 87 and to the other positive input of the sum circuit 88.

The sum signal from the adder 212-1 connects through a sample-and-hold unit 213 (S/H) and a lowpass filter 220-1 (LPF) to the negative input of a subtractor 219-1. The positive input to the subtractor 219-1 is the REF1 signal from the timing and reference circuit of FIG. 17. The output from subtractor 219-1 connects as an input to the frequency equalizer 108.

The difference signal from circuit 87 connects as one input to the analog divider 97. The sum signal from the circuit 88 is proportional to the left wall data beam reflected intensity and connects as the other input to the analog divider 97. The analog divider 97 divides the sum signal by the difference signal providing an intensity normalized left wall output data signal, $V_1(t)$, which is proportional to the left wall modulation. The multiplier 93 multiplies the data signal from divider 97 by $R_y(t)$ from FIG. 17 to provide the radius-independent left wall data signal, $V_1(t)_R$, on line 154. The data signal on line 144 is proportional to the left wall velocity in the $Y_{+45z}$axis direction. The left wall data signal on line 144 is RIAA equalized in circuit 102 to provide the left wall audio signal, $V_1(t)_A$, on line 114.

The subtractor 219-1 provides the left wall error signal, $Vl\text{-}_{err}(t)_y$, on line 156. The error signal on line 156 connects to the frequency equalizer 108 which provides the equalized signal on line 170.

The left wall velocity signal, $V_1(t)_R$, on line 144 is processed in the feed forward filter 104 (AC-coupled integrator) and is connected through a switch 105 to the sum circuit 107. The sum circuit 107 sums the integrated velocity signal from filter 104 with the equalized error signal from equalizer 108 and connects its sum output, on line 77-1 (connects to FIG. 17) through the switch 106 as the left scanner signal, $Vl_s(t)_y$, on line 77 for the scanner in FIG. 19. Similarly, the signal on line 77' connects to a duplicate right wall scanner like FIG. 19.

Due to the use of a microprocessor 113 of FIG. 17 in the groove tracking servo loop, special additional processing of the tracking data can be incorporated to reduce susceptibility to groove anomalies. For example, by restricting unusual lateral (Y-axis) acceleration components, anti-scratch immunity can be provided. Optimal groove tracking can be provided by using the previous tracking history which can be stored in processor 113. Programmability and song cuing is easily accomplished by searching for the wide land region 37 between songs.

The electronics of FIGS. 16 and 17 are capable of operating in several different modes. In a first mode, switch 106 is open so that a single Y-axis servo loop exists. The single Y-axis servo loop, called the carriage servo loop, consists of the frequency equalizers 108 and 108,, the adder 225, the filter 109, the A/D converter 110, the digital processor 113, the motor drive 160 in FIG. 16 and the motor 78, the sliding carriage 86 together with the optical assemblies 79 and 80 of FIG. 14.

The servo system in the first mode (switch 106 open) can easily follow a groove over its approximately 4 inches (100mm) of lateral Y-axis travel. The audio quality produced, however, is dependent upon the degree of lateral groove modulation relative to the closed loop tracking bandwidth of the carriage servo and upon the sensing geometry. A highly modulated groove for example, may be 3 mils ($3 \times 10^{-3}$ inch) wide and travel 10 mils ($10^{-2}$ inch) peak to peak at a 400Hz rate. Such groove modulation can be tracked with as little as 20Hz bandwidth although the audio quality will suffer due to land groove truncation of the reflected rays during times of high lateral modulation. To avoid distortion, a high servo bandwidth consistent with the modulation tracking requirements must be provided. In the first mode, the high bandwidth lateral tracking servo provides hi-fidelity audio reproduction by carefully designing the electro-mechanical carriage servo loop. This task becomes more difficult as the mass of the carriage 86 (including optical assemblies 79 and 80) increases due to power requirements and mechanical resonances. In one example of the first mode, frequency equalizers 108 and 108, have a constant gain over all frequencies of interest and low pass filter 109 has a 100 Hz cutoff frequency.

Figure 19:
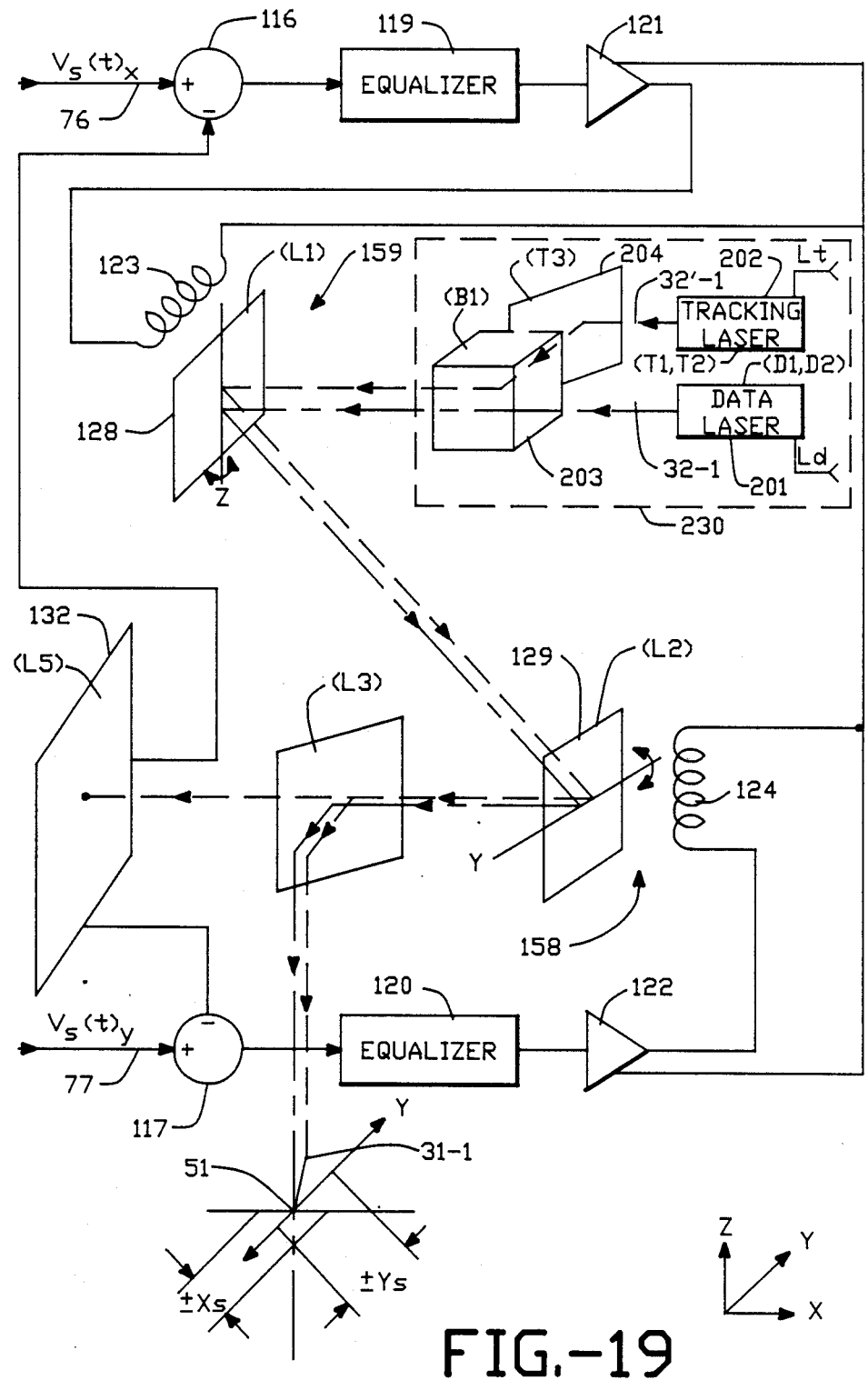
FIG. 19 depicts an XYZ isometric optical schematic view of the lateral tracking, tangential tracking and data units for the left wall.

In order to simplify the design requirements of the carriage servo from what is required in the first mode, a second mode is provided. In the second mode, left and right servo loops are employed. In the left loop, switch 106 is closed and small low-inertia moving-mirror galvanometer scanners 158 in FIG. 19, mounted in the optical assembly 79 of FIG. 14, is employed. The Y-axis scanner 158 has a limited range which causes a small lateral translation, $\pm Y_s$ in FIG. 19, of the incident rays 31-1 and 32-1 about point 51 in response to a current applied to the coil 124. A scanner servo loop is provided as shown in FIG. 19 including scanner 158, sensor 132, difference circuit 117, equalizer 120 and amplifier 122. Embedding the scanner 158 in the servo loop allows more control over the scanner, but satisfactory operation can be achieved at lower cost using the scanner alone.

This second mode arrangement of a lateral Y-axis scanner has several practical advantages over the sole use of the carriage servo of the first mode. Particularly, the groove tracking accuracy is no longer dependent on the carriage servo mechanical properties, but is determined by the scanner servo dynamics, which can easily have a bandwidth of several kilohertz (even up to 20KHz). In this second mode, the carriage servo loop of the first mode becomes a servo following loop which attempts to hold $V_{ls}(t)_y + V_{rs}(t)_y$ equal to 0 and in so doing, keeps the scanner mirrors 129 (129' not shown) in scanner 158 (158' not shown) centered such that the incident rays remain in a middle position at point 51 between $+Y_s$ and $-Y_s$.

In the second mode, groove tracking accuracy is determined by the total lateral servo characteristics and in particular the frequency equalizers 108 and 108' and the scanner alone or when employed the scanner servo characteristics. The equalizers 108 and 108' in the second mode are designed to frequency compensate either the scanner alone or the scanner servo dynamic properties for best tracking performance. In either of the second modes, the open loop transfer function from $V_{err}(t)_y$ to $P_c(t)_y$ (hereinafter defined) has the property of high gain at low frequencies and low gain above the desired closed loop bandwidth. The existence of a high gain causes $V_{err}(t)_y$ to remain small in response to groove motion.

The carriage 86 in the second mode can be large and heavy to serve as a stable base for the scanner, sensors, and other components. The scanner also makes the carriage servo easy to design by eliminating any dependency on sensor gain variations. This result is possible because the scanner output position, $P_s(t)_y$, is directly determined by the scanner input, $V_s(t)_y$, over the range of frequencies that the carriage 86 must respond.

In a third mode of operation, an indirect measurement of the groove velocity using the filtered groove wall velocity signals $V_l(t)_R$ and $V_r(t)_R$ are employed by having both switches 105 and 105' and 106 and 106' closed. The velocity signals are integrated in filters 104 and 104' and AC-coupled to eliminate DC errors, to form groove wall position signals on line 172 and 172' which represent a groove wall position trajectory. The position trajectory signal is used to significantly reduce the AC component of the groove error when the scanner servo is designed such that the change in scanner position $P_s(t)_y$ is proportional to the change in $V_s(t)_y$ over the desired range of frequencies and travel. When the scanner servo has this property, the application of $V_s(t)_y$ forces the mirror 129 to precisely follow the groove AC component. This operation has a large impact on the overall lateral servo performance because now the lateral carriage servo only need track the difference between position established by the groove trajectory signal and the actual groove position, $P_g(t)_y$. This operation is desirable because now the carriage servo bandwidth can be reduced for the same tracking performance thereby minimizing sensitivity to noise disturbances exhibited by the error signals, $V_{err}(t)_y$. Such noise disturbances may arise due to damage to the land-groove interface on records. These same noise disturbances do not affect $V_s(t)_y$ which is amplitude insensitive.

For both the right and left groove walls, the position, $P_c(t)_y$, of the incident light rays (axis 57) is determined by scanner position component, $P_s(t)_y$, (determined by scanner 158 and mirror 159) and by the carriage position component, $P_{car}(t)_y$, (determined by carriage 86) as follows:

$$P_c(t)_y = P_s(t)_y + P_{car}(t)_y. \qquad (17)$$

The positional error, $P_{err}(t)_y$, is the difference between the incident light ray position, $P_c(t)_y$, and the groove position, $P_g(t)_y$, as follows:

$$P_{err}(t)_y = P_g(t)_y - P_c(t)_y \quad (18)$$

Using Eq. (17), in Eq. (18) yields, $$P_{err}(t)_y = P_g(t)_y - [P_s(t)_y + P_{car}(t)_y] \quad (19)$$

From Eq. (19), the scanner tracks (with higher bandwidth) the groove position, $P_g(t)_y$, so that the carriage position, $P_{car}(t)_y$, need only track the difference $[P_g(t)_y - P_s(t)_y]$. The difference $P_g(t)_y - P_s(t)_y$ changes much more slowly (lower bandwidth) than does $P_g(t)_y$ when operated in accordance with the third mode. By way of contrast, in the first mode with no scanner operation, $P_{car}(t)_y$ must track changes in the groove position, $P_g(t)_y$, directly since $P_s(t)_y$ is a constant. The $V_{err}(t)_y$ signal is proportional to $P_{err}(t)_y$.

In FIG. 17, an adder 225 receives the left and right error signals on lines 77'-1 and 77'-1 from FIG. 16 and provides the sum error signal to a low pass filter 107 which provides the filtered low pass error signal on line 171. The analog-to-digital converter 110 provides a digital error signal to the digital processor 113. Digital processor 113 in response to the error signal provides a positional command signal, $V_c(t)_y$, on line 75. The converter 110 and processor 113 are convenient when motor 78 (FIG. 14) is digital, but equivalent analog components can be employed. The positional command signal on line 75 commands the stepping motor 78 and carriage 86 in FIG. 14 to the desired Y-axis position $P_c(t)_y$. That Y-axis position is the one which tends to center the carriage and the light sources 43-1 and 43-2 such that the center axis 47 of the left and right walls 25 and 26 is collinear with the carriage center axis 57. To the extent that the axes 47 and 57 are not collinear, like shown in FIG. 10 and FIG. 12, the error signal, $V_{err}(t)_y$, has a non-zero value which is processed and input to the digital processor 113 so as to command a movement in the Y-axis direction. Such movement and operation tends to servo the carriage 86 of FIG. 14 such that the groove section under the sensing region 15 becomes symmetrically disposed and the error signal, $V_{err}(t)_y$, becomes a zero value.

The digital processor 113 also provides on line 258 a digital representation of the radius $R_y(t)$ which is input to the digital-to-analog converter 111. Processor 113 establishes the $R_y(t)$ value by resetting to a known position (for example, established by a limit switch not shown) and incrementing for each step. Converter 111 provides the analog value of $R_y(t)$ as inputs to the multipliers 93 and 94.

The digital processor 113 also provides on line 259 an X-axis position signal to the digital-to-analog converter 112. Converter 112 provides an analog signal, $V_s(t)_x$, on line 76 controlling the X-axis scanner 158 in FIG. 19 to correct for tangential velocity variations due to record hole off-centeredness and/or ellipticity. Processor 113 senses the X-axis runout over one or more revolutions and utilizes the runout so determined in such revolutions to generate $V_s(t)_x$ so as to null the effects of the runout in the next revolution.

Figure 18:
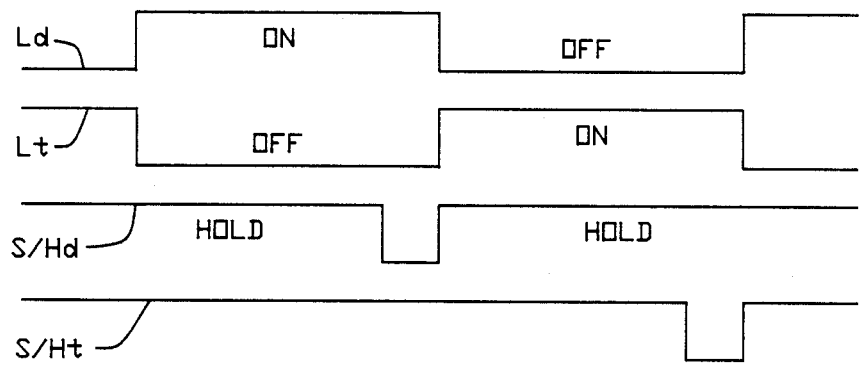
FIG. 18 depicts waveforms representing the operation of the FIG. 17 circuit.

In FIG. 17, the timing and reference generator 226 generates a clock (CLK) signal for clocking the processor 113 The timing and reference generator 226 generates the laser timing signals Ld and Lt which are on and off in alternate 5 microsecond half periods as shown in FIG. 18. for controlling the lasers 201 and 202 of FIG. 19 such that one laser is on when the other is off. The timing and reference generator 226 generates the sample-and-hold signals S/Hd and S/Ht with 10 microsecond periods as shown in FIG. 18 for controlling the sample and hold circuits of FIG. 16. Basically, when the tracking laser 202 of FIG. 19 is on, the tracking sample-and-hold signal S/Ht activates the tracking channel sample-and-hold gates of FIG. 16 and when the data laser 201 of FIG. 19 is on, the data sample-and-hold signal S/Hd activates the data channel sample-and-hold gates of FIG. 16. In this way, the sensors 40-1 and 40-2 are time-multiplexed between data sensing and tracking sensing.

Record Eccentricity

The major source of record wow and flutter (speed variations) is the incorrect position (and/or size of the record hole. It is not uncommon to find a 0.5 to 1 mm offset error which generates a 1% or so tangential error from the resulting speed inaccuracy. This tangential error manifests as tonal variation of the music if not compensated.

In addition, the effect of this eccentricity is a requirement to bi-directionally track the lateral position slide. Rather than a unidirectional radial tracking requirement for a perfect spiral, the eccentricity requires reversals in direction for bi-directional tracking.

Record Ellipticity

Unfortunately the advances of unidirectional tracking can still not be applied because of a second bi-directional tracking requirement. Due to the nonuniform cooling of the pressing operation and to the long term flow of the vinyl, there exists a general ovallity of records which manifests as a fundamentally twice-around requirement for tracking reversal.

A typical ellipticity measurement of a record is only 50 to 200 microns; however, this value is sufficient to necessitate bi-directional movement.

Land Dropouts

Within songs on many records, the land between songs appears to dropout [see FIG. 5]. This dropout is typically due to major lateral modulation excursions and is therefore transient. Such land dropouts have no effect on the preferred tracking methods of the embodiments described.

Scanning

The entire optical system uses two lasers. The data laser is split into two equal power beams to provide the left and right data light beams. About 10% of the tracking laser power is split off to provide the height sensor light beam as described in the cross-referenced application and as indicated FIG. 20, The remainder of the tracking laser beam is split into two equal power beams to provide the left and right tracking light beams. The data laser beam is sent into one face of a cube beam splitter and the tracking beam is sent into an orthogonal face of the cube splitter. Half of each beam emerges from the two other splitter faces orthogonal to each other; the beam pair from one face are the right channel data and tracking beams and the pair from the other face are the left channel beams.

The beauty of this optical configuration is that we can adjust the beam splitter in the tracking beam before the cube splitter to adjust the relative tracking/data spot geometry on the groove wall. The optical system provides that whatever tracking/data spot geometry exists for one channel will be identical for the other channel.

In FIG. 19, scanning components for the left wall detector are shown. The dual beam source 230 of FIG. 19 is also used with the right wall detector (not shown in FIG. 19). The dual beam source includes the tracking laser unit 202 and the data laser unit 201 providing beams 32'-1 and 32-1, respectively. The tracking beam 32'-1 is directed by mirror 204 to the beamsplitting cube 203 where it is combined with the data beam 32-1 to form the combined beam 32'-1,32-1. The combined beam is incident an the tangential servo mirror 128. The tangential servo includes the difference circuit 116, equalizer 119, amplifier 121, and scanner 159. A lateral scanner servo loop is provided including scanner 158, sensor 132, difference circuit 117, equalizer 120 and amplifier 122. Embedding the scanner 158 in the servo loop allows more control over the scanner, but satisfactory operation can be achieved at lower cost using the scanner alone. The purpose of the tangential (X-axis) unit 34 is to cause the tracking assembly 9 to track any tangential movement of the record groove thereby reducing wow and flutter. When the tracking assembly 9 is tracking without tangential error, the tangential groove velocity, $V_T(t)$, at the sensing point 51 follows the relationship $V_T(t) = 2\pi R_{yr}(t)/T$ where T is the revolution time of the record and where the origin of $R_{yr}(t)$ is the true center of the spiral groove 20. If the actual groove center radius, $R_y(t)$, is allowed to vary during playback due to the record(or record hole) being off-centered thereby resulting in wow(once per revolution error), or due to record ellipticity resulting in flutter(twice per revolution error), then the audio signal will be frequency modulated resulting in low frequency audio modulation, that is, resulting in wow and flutter.

The unwanted low frequency change in frequency, $df_s$, is given by the following Eq. (21):

$$df_s = (2\pi) [dR_{yr}(t)]/(T\lambda) \quad (21)$$

where, $\lambda$ = spatial wavelength of the signal on the record.
= $V_T(t)/f_s$ The record drive assembly 11 insures that T is held constant thereby eliminating T-caused unwanted $V_T(t)$ variations. The tangential unit 34 prevents low frequency errors in the audio output signal due to $df_s$ from occurring by simply servoing the groove angle detection point in the tangential (X-axis) direction in order to hold the actual radius $R_y(t)$ equal to the error-free center radius $R_{yr}(t)$. This servoing is accomplished with a tangential servo unit including tracking scanner 159 in FIG. 19 having characteristics similar to the lateral scanner 158. The tangential scanner 159 is placed in the light path to receive rays 160 before (or after) the scanner 158 and oriented as shown in FIG. 19. This tangential (X-axis) servo is operated open loop in that its command signal, $V_s(t)_x$, is derived from the low frequency carriage 86 motion. The low frequency motion of the record corresponds to once-around and twice-around frequency components that are extracted by processor 113. The processor 113 output is connected through the D/A converter 112 to form the tangential signal, $V_s(t)_x$, which drives the tangential scanner. The tangential servo loop includes the difference circuit 16, the frequency equalizer 119, the amplifier 121 and the low-inertia movingmirror galvanometer 159 (driven by coil 123).

Figure 20:
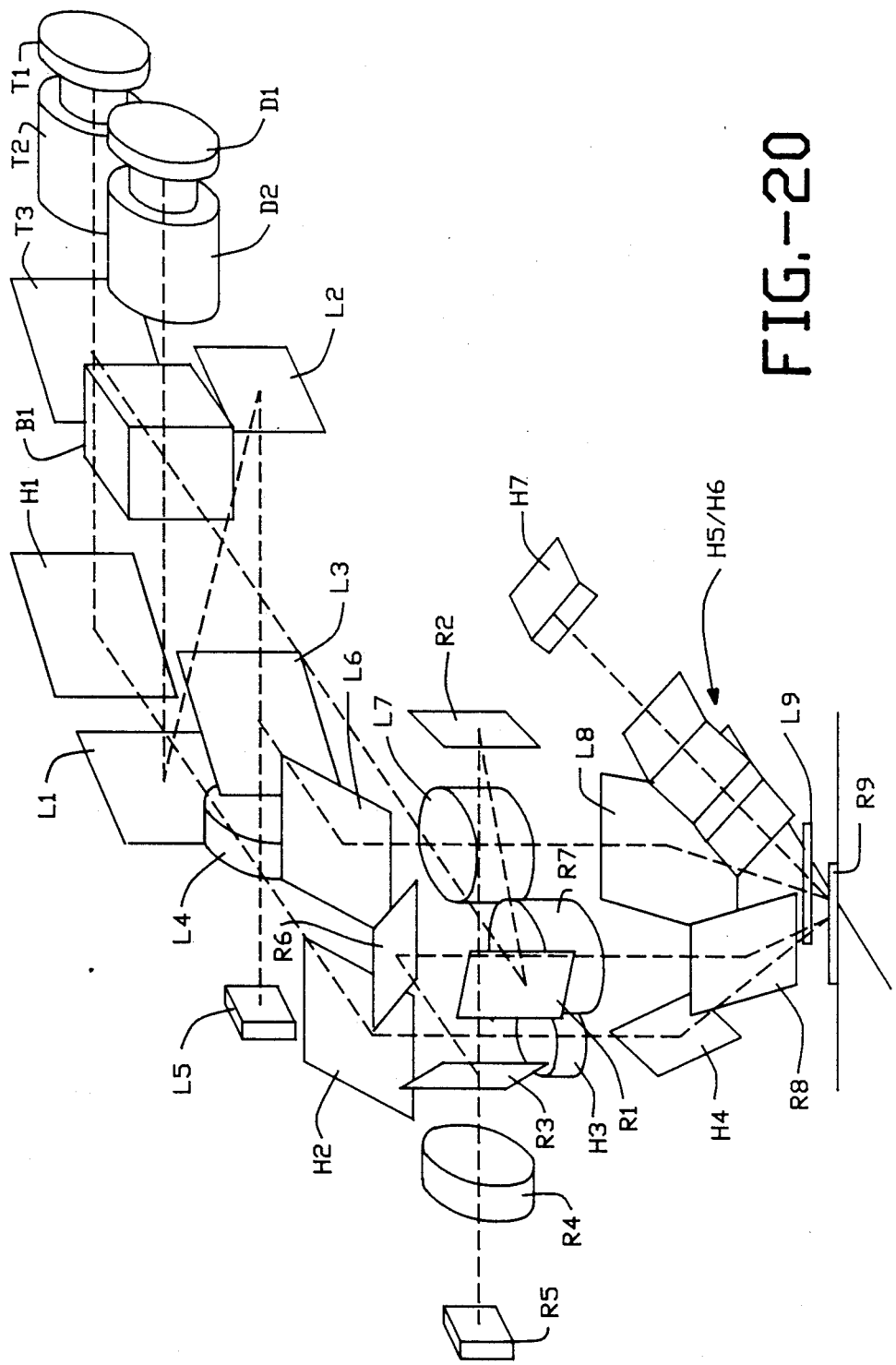
FIG. 20 depicts an XYZ isometric optical schematic view of all of the optical units of the present invention.

The FIG. 19 scanner for the left wall detection is duplicated, except for the dual beam source 230 for the right wall detector as shown in FIG. 20.

Optical Assembly

In FIG. 20, further details of the optical assemblies 79 and 80 of FIGS. 14, 15 and 19 are shown. The individual optical elements are identified in TABLE 1.

TABLE 1

| | |
|---|---|
| T1 | Tracking Laser |
| T2 | Tracking Collimating Lens |
| T3 | Height/Tracking Splitter |
| D1 | Data Laser |
| D2 | Data Collimating Lens |
| B1 | Beam Merging Cube Splitter |
| R1 | Right Channel Adjustment Mirror |
| R2 | Right Scanner |
| R3 | Right Servo Splitter |
| R4 | Right Servo Lens |
| R5 | Right Scanner PSD |
| R6 | Right Tweaker Mirror |
| R7 | Right Focussing Lens |
| R8 | Right Data Tower Mirror |
| R9 | Right Data PSD |
| L1 | Left Fixed Mirror |
| L2 | Left Scanner |
| L3 | Left Servo Splitter |
| L4 | Left Servo Lens |
| L5 | Left Scanner PSD |
| L6 | Left Tweaker Mirror |
| L7 | Left Focussing Lens |
| L8 | Left Data Tower Mirror |
| L9 | Left Data PSD |
| H1 | Height Adjustment Mirror |
| H2 | Height Tweaker Mirror |
| H3 | Height Cylinder Lens |
| H4 | Height Tower Mirror |
| H5 | Height Imaging Lens |
| H6 | Height Imaging Lens |
| H7 | Outer Height PSD |

SYSTEM PERFORMANCE AND ADVANTAGES.

The optical system of the present invention has significant performance advantages compared to mechanical stylus systems. These advantages derive in part from the non-contact nature of an optical system.

No Wear

Data extraction via laser requires no contact between the optical detectors and the record, resulting in a no-wear system turntable. A no-wear turntable system permits unlimited playing of conventional records without deterioration in sound unlike conventional turntables.

Resurrection of Worn Records

The optical data extraction method senses from a different part of the record groove than does a mechanical stylus. Therefore, the area of the groove "pitted" by the stylus will be ignored or minimized (see FIG. 7). Essentially, this allows pitted or worn records to be "resurrected".

No Stylus Replacement

The laser is expected to last well over 10,000 hours of use.

Improved Sound Quality

The optical turntable system provides a 10 time reduction in total harmonic distortion relative to the best mechanical systems. Many independent factors contribute to this reduction.

One factor is the overall Signal-to-Noise Ratio(SNR). The optical turntable system consistently measures better than 76dB SNR. This SNR is typically 15 to 20 dB better then the record material and 30 to 40 dB better than mechanical styli. Another factor is frequency response. The optical turntable system frequency response is flat 20Hz to 16KHz (−4dB at 20KHz) with no dips or peaks in between. A stylus, however, is a mechanical beam which becomes lossy above 1KHZ and has several resonances out to 20KHz.

If the record were indefinitely rigid and the effective stylus-tip impedance zero, then the stylus motion at each groove wall for a 1KHz square wave would be projected as a series of V-shaped segments topped by an arc with a radius equal to the radius, $R_s$, of the stylus. The normal acceleration, A, of the arc-shaped portion is described by:

(Eq. 22) $A = V_g/R_s$  (22)

where:
$V_g$ = linear groove velocity (cm/sec)
$R_s$ = radius of stylus tip(cm)

For typical $V_g$ and $R_s$ values of 50 cm/sec and 0.00178 cm, acceleration on the order of $1.4 \times 10^6$ cm/sec$^2$ (equivalent to 1400 G units) would occur according to CBS Laboratories, Square Wave Tracking and Intermodulation Test Record, STR 112, (Back cover) and White, James V., "Mechanical Playback Losses and the Design of Wideband Phonographic Pickups", AES Convention Proceedings, Oct 7, 1971, Published in AES Anthology #1, p. 233.

Acceleration at the bottom of the V-shaped section of a groove would be infinite. In practice, a mechanical stylus actually deforms the elastic groove wall (over 22,000 PSI) and follows an acceleration profile which depends upon distorting the groove wall.

The abrupt changes in slope tend to cause oscillations of the playback system resulting, for example, from the stylus assembly groove compliance. Since the optical beam in the optical turntable system has no inertia, a practically perfect wave reproduction can be realized.

The light sources 201 and 202 are semiconductor laser diodes. The laser beams 32-1 and 32'-1 emitted by the laser diode 201 and 202 are diverging with different diverging angles horizontally and vertically. Most of the emerging beam is collected into an elliptical collimated beam by collimating lenses D2 and T2. A "collimated" beam is one whose cross-section geometry remains approximately the same along the optical axis for the beam length used in the system. The beam has a spatial intensity profile that is roughly Gaussian. The beam width is defined as the width where the beam intensity falls to 1/e^2 (13.5%) of the peak intensity level at the center of the beam. The elliptical collimated beams 32-1 and 32'-1 from lenses D2 and T2 have beam sizes of roughly 2.2mm ×6mm.

These collimated beams are focused onto the groove wall by focusing objective lenses R7. The focused spot intensity profile is the spatial two dimensional Fourier transform of the intensity profile of the collimated beam. The spot size is defined by the 1/e^2 intensity widths similar to the collimated beam. The 30mm focal length focusing lens produces a focused spot on the record that is roughly 20um ×8 um. The side dimension of the collimated beam focuses into the narrow dimension of the focused spot.

The beams reflected off of the groove wall is intersected by and forms a light spot on the PSD. The spot shape on the PSD is approximately the Fraunhoffer diffraction pattern of the spot shape leaving the groove. The Fraunhoffer diffraction pattern is described by the spatial two dimensional Fourier transform of the focused spot intensity profile. The tracking system is designed to keep the data beam, riding a fixed distance below the data beam, hitting the groove wall such that it will leave the groove untruncated by the edges of the groove. The data spot on the PSD will be a small spot with a Gaussian intensity profile. The tracking system forces the tracking beam half onto the land above the wall and half on the wall; the half hitting the groove wall will reflect back to the PSD. The intrack dimension (along the groove) of the tracking spot is unimpeded and will reflect out of the groove to form a spot on the PSD that has a Gaussian intensity profile horizontally (the position sensitive dimension of the PSD). In the crosstrack dimension (up and down the groove wall), the focused spot will be truncated at the middle of the spot, as shown in FIGS. 8-13. The vertical dimension of the tracking spot hitting the PSD will be smeared and contain side-lobes as described by the Fourier transform of the truncated Gaussian intensity profile as shown in FIG. 21.

The PSD produces a current out of each end dependent on the intensity and position of the beam hitting the sensor. Define the beam forming the spot by a collection of individual light rays each with an intensity of I(jx,jz) where (jx,jz) is the location the ray hits the PSD; the X dimension is the position sensitive dimension. The output, Xo, of the PSD will be determined by the center of intensity of all of the rays hitting the sensor (the centroid of the spot on the PSD):

$$Xo = \sum_{jx=-\infty}^{\infty} \left[ \left( \sum_{jz=-\infty}^{\infty} I(jx,jz) \right) * X(jx) \right]$$

Where X(jx) is the X location of the (jx,jz) light ray.

While the tracking beam shape on the PSD is corrupted in the vertical, Z, dimension by the beam truncation, the centroid of the beam in the sensitive, X, dimension of the PSD is unchanged from the untruncated case. The total intensity of the tracking beam will be half of that from an untruncated beam.

On brief (<25um) passages of some records, the vinyl is damaged to form a groove wall surface that resembles sandpaper. This sandpaper scatters the beam in all dimensions. The spot hitting the PSD reflected off of a sandpaper region will be reduced significantly in intensity and will have a centroid location on the PSD that can be significantly different from that reflected off of a proper smooth groove wall. This causes a short term drop (<15usec) out in the tracking signal. Due to the relatively low tracking bandwidth, the quick signal dropouts are filtered (integrated) out of the tracking signal. The tracking system is insensitive to short term signal dropouts.

The intrack direction requirement for the focused data spot geometry is to keep the spot small enough to faithfully reproduce the shortest signal wavelengths (highest frequencies) on the record. The spot needs to be large enough to provide enough depth of focus to allow the beam to stay in focus as the groove wall moves around. Crosstrack, the beam needs to be small enough to keep the beam fitting in the narrow grooves and large enough to average out as much of the vinyl wall surface as possible. The data spot we have selected is approximately 6um intrack by 22um crosstrack.

Figure 24:
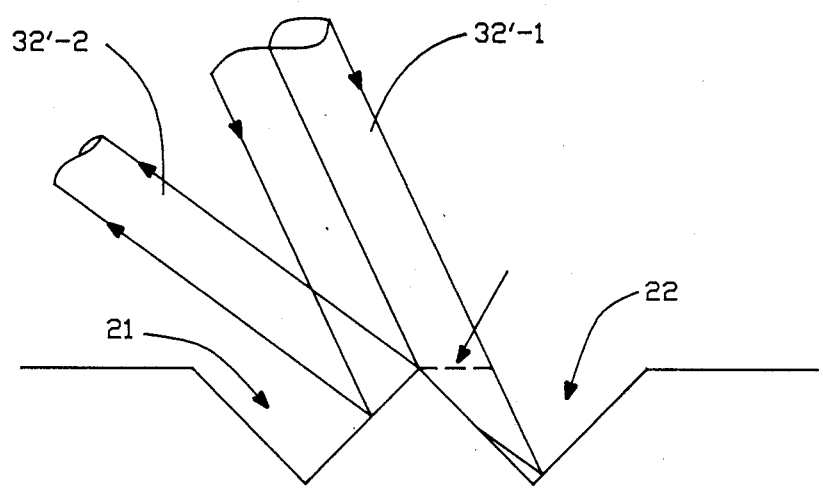
FIG. 24 depicts the light rays for a tracking beam relative to two groove sections when no land separates the groove sections.

The intrack direction requirements for the focused tracking spot geometry is to keep the spot small enough to provide at least 5KHz of tracking information and to keep the spot as large as possible to average out as much wall and land/groove interface region as possible. Crosstrack the spot needs to be small enough to fit in the groove and not to give us crosstalk between adjacent grooves when there is no land as shown in FIG. 24. With the incident beam hitting the record at an angle above normal to the groove wall, there is a dead zone between the adjacent grooves (see FIG. 24). The tracking spot needs to be as large as possible crosstrack to give us as much lateral tracking range as possible. The tracking spot we have selected is the same 6um by 22um as the data beam. A more optimum spot would be closer to a 20um round spot, however, the laser diodes we are using produce elliptical spots, so we compromised on the tracking spot geometry to keep the design simple.

As described in the cross-referenced application and shown in FIG. 6, the reflected spot sweeps back and forth on the PSD as the groove wall angle changes with signal modulation. The beam paints out an arc on the PSD due to the fact that the incident beam is not in the plane containing by the wall normal vector as the wall changes angle. This arc will be a flat line for an incident (and reflected) beam normal to the nominal groove wall. This would be an incident beam at 45 degrees above the horizontal plane of the record. As the incident beam angle departs from the wall normal, the arc gets more severe. (See FIG. 6.) This arc requires the PSD to be larger to collect the light and the arc makes it more difficult for the reflected beam to get out of the groove without being truncated by the opposite groove wall.

In order to reduce the problems of the arc, the beam angle was lowered from 60 degrees to 58 degrees. Ideally, we would use an incident beam angle of 45 degrees, however, this is not a practical configuration since the incident beam would have to pass through the PSD. We have built a 52 degree system, however, this worked poorly because the incident beam barely hit the bottom of the PSD. The 58 degree system is about the optimum practical system with sensor/package technology available today.

Figures 25, 26:
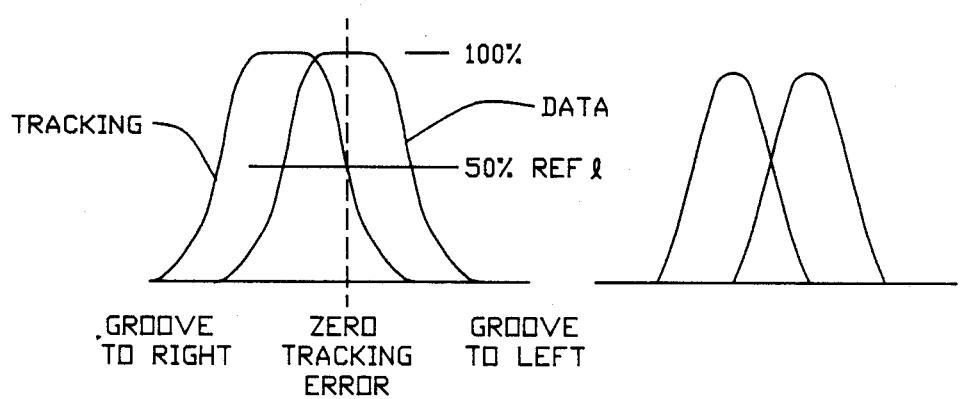
FIG. 25 depicts the signal levels for data and tracking derived from a wide groove section.
FIG. 26 depicts the signal levels for data and tracking derived from a narrow groove section.

In FIG. 25, the waveforms depict the detected data signal and the detected tracking signal as a function of optical sensor position relative to the left groove wall for a wide groove. The reference signal REFl, as shown in FIG. 25, is the average signal value and is provided as a constant by the timing and reference unit of FIG. 17. Note that both the data signal and the tracking signal on the right side fall off and this falloff is a result of the incident light reflecting from the land 37, and, therefore, not being detected by the optical sensor. Also note in FIG. 25, that the signals fall off on the left side and this left side falloff is the result of the reflected optical beams being truncated by the right wall of the groove being detected In FIG. 26, the waveforms depict the detected data signal and the detected tracking signal as a function of optical sensor position relative to the left groove wall for a narrow groove. In FIG. 26, the falloff on the right side is the same as in FIG. 25 for the same reasons, that is, light incident on the land 37, The falloff on the left side of FIG. 26 occurs closer to the falloff on the right side because truncation commences earlier in the case of a narrow groove.

Both FIGS. 25 and 26 depict the waveforms for the left wall sensor. The waveforms for the data signal are detected during the data portion of the time multiplexing and the tracking signal is detected during the tracking portion of the time multiplexing. The sampling period for the time multiplexing is at a much higher frequency than the period of the waveform of FIGS. 25 and 26.

While the signals of FIGS. 25 and 26 are for the left wall detector, an identical set of signals exists for the right wall detector in which case the reference signal level REFr is set at the average value of those right wall signals.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An optical turntable system for playing a record having a recorded signal in a groove where the groove is formed by at least a first wall having a position modulated by the recorded signal comprising,
   an optical unit including an optical source and an optical sensor, said source providing a data light beam incident to form an incident spot on said wall and a reflected beam from said wall forming a reflected spot, formed by incident rays at said optical sensor, said reflected spot having a spot position measured by the centroid of said incident rays where said spot position is proportional to the recorded signal, said optical sensor sensing the spot position of said reflected spot to provide an output signal proportional to the recorded signal,
   a drive assembly for moving the record relative to said optical unit.

2. The system of claim 1 wherein said groove is formed by said first wall and by a second wall where said first wall and said second wall intersect at an angle of approximately 90 degrees, each of said walls at an angle of approximately 45 degrees with respect to a plane formed by the surface of said record, and wherein said optical source provides said light beam incident onto said first wall at an angle in the range of 10 to 24 degrees with respect to an axis normal to the plane of said first wall at the point of incidence of said first beam on said first wall.

3. The system of claim 1 wherein said groove is formed by said first wall and by a second wall where said first wall and said second wall intersect at an angle, each of said walls extending at an angle with respect to a plane formed by the surface of said record, and wherein said optical source provides said light beam incident onto said first wall at an incident angle with respect to an axis normal to the plane of said first wall at the point of incidence of said first beam whereby the reflected angle for said reflected beam is proportional to said incident angle and said recorded signal.

4. The system of claim 3 wherein said optical unit includes a vertical unit for positioning said optical unit a predetermined height from said record.

5. The system of claim 3 wherein said optical unit includes a tracking assembly for causing a tracking light beam to be tracked with said groove as the record rotates.

6. The system of claim 5 wherein said tracking assembly includes a lateral unit having lateral detector means for detecting the lateral position of said groove and for providing a lateral error signal as a function of the lateral displacement of said tracking light beam relative to said groove and having lateral servo means responsive to said lateral error signal for tracking said light beam in said groove.

7. The system of claim 6 wherein said lateral detector means includes a first detector for providing a first detector signal for indicating the lateral position of said first wall and includes a second detector for providing a second detector signal indicating the lateral position of said second wall, said lateral detector means including electronic means for processing said first detector signal and said second detector signal to provide said lateral error signal.

8. The system of claim 7 wherein said first detector includes a first source receiving said tracking light beam and for providing a first incident tracking light beam onto said first wall whereby a first reflected tracking beam is reflected from said first wall, and including a first sensor for sensing said first reflected tracking beam, said sensor providing said first detector signal, and wherein said second detector includes a second source for receiving said tracking light beam and for providing a second incident light beam onto said second wall whereby a second reflected tracking beam is reflected from said second wall, and including a second sensor for sensing said second reflected tracking beam, said second sensor providing said second detector signal.

9. The system of claim 8 wherein said first source and said first sensor are positioned relative to said first wall such that said first reflected tracking beam has a first component reflected from said first wall whereby said first detector signal is proportional to said first component of said first reflected tracking beam, and wherein said second source and said second sensor are positioned relative to said second wall such that said second reflected tracking beam has a second component reflected from said second wall whereby said second detector signal is proportional to said second component of said second reflected beam.

10. The system of claim 9 wherein said tracking assembly includes electronic means for processing said first and second detector signals to form first and second lateral error signal components, said electronic means including means for adding said first lateral error signal component and said second lateral error signal component to form said lateral error signal.

11. The system of claim 9 wherein said electronic means includes filter means for filtering said lateral error signal, and means for providing a lateral drive signal and wherein said lateral servo means includes a motor, responsive to said lateral drive signal, for driving said lateral detector means in a direction which tends to reduce said lateral error signal.

12. The system of claim 6 wherein said lateral servo means includes equalizer means for filtering said lateral error signal, said equalizer means having a high gain at low frequencies within the pass band of said lateral servo means and a low gain for frequencies above said pass band, said frequency equalizer providing a frequency equalized signal, and includes a first servo loop and a second servo loop each receiving said frequency equalized error signal, said first servo loop including high bandwidth scanner means for causing the incident light beam to track the lateral position of said groove, said second servo loop including a carriage for translating said optical unit in the lateral direction, including motor means for driving said carriage in the lateral direction, and including a low frequency filter for filtering said frequency equalized error signal to form a filtered error signal for driving said motor means whereby said carriage tracks said groove in the lateral direction with a low frequency response.

13. The system of claim 12 wherein said scanner means includes a scanner servo loop, said scanner servo loop including a scanner for scanning said incident beam in said lateral direction, a scanner sensor for sensing the position of said scanner and for providing a scanner signal, difference means for subtracting said scanner signal from said equalized error signal to provide a scanner difference signal, equalizer means for filtering said scanner difference signal to provide a scanner drive signal for driving said scanner to cause said incident beam to track said groove position with a high frequency response.

14. The system of claim 13 wherein said scanner is a low-inertia moving-mirror galvanometer.

15. The system of claim 13 wherein said electronic means includes means for forming a velocity signal from said first and second detector signals, feed forward filter means for integrating said velocity signal to form a trajectory signal, means for summing said trajectory signal and said equalized error signal for providing said scanner signal 16. The system of claim 12 wherein said second servo loop includes a digital processor, an analog-todigital converter for converting said filtered error signal to a digital filtered error signal, and wherein said digital processor provides said digital error signal as the drive signal to said motor means.

17. The system of claim 5 wherein said tracking assembly includes a tangential unit having tangential detector means for detecting the tangential position of said groove and for providing a tangential signal as a function of the tangential runout of said groove for revolutions of said record relative to said optical unit, and including tangential scanner means driven by said tangential signal for tracking said groove in the tangential direction whereby wow and flutter in said output signal are reduced.

18. The system of claim 17 wherein said tangential scanner means includes a low-inertia movingmirror galvanometer driven in response to said tangential signal.

19. The system of claim 17 wherein said tangential scanner" means includes a tangential servo comprising a tangential scanner for positioning said incident beam in a tangential position, a tangential sensor for sensing the tangential position of said incident beam to provide a tangential sensor signal, difference means for subtracting said tangential sensor signal from said tangential signal to provide a tangential difference signal, equalizer means for filtering said tangential difference signal to provide said tangential signal for driving said tangential scanner to cause said incident beam to track the tangential position of said groove whereby wow and flutter are reduced.

20. The system of claim 5 wherein said tracking assembly includes a tangential unit having tangential detector means for detecting the tangential position of said groove and for providing a tangential error signal as a function of the tangential displacement of the light beam relative to said groove and having tangential servo means responsive to said tangential error signal for tracking said light beam in said groove.

21. The system of claim 5 wherein said tracking assembly includes detector means for detecting the position of said groove and for providing an error signal as a function of the displacement of the light beam relative to said groove and having servo means responsive to said error signal for tracking said light beam in said groove.

22. The system of claim 21 wherein said detector means includes a first detector means for providing a first detector signal for indicating the position of said first wall and includes second detector means for providing a second detector signal indicating the position of said second wall, said detector means including electronic means for processing said first detector signal and said second detector signal to provide said error signal.

23. The system of claim 5 wherein said tracking assembly includes a vertical unit for positioning said optical unit a predetermined height from said record.

24. The system of claim 6 wherein said lateral unit further includes a first optical assembly moved laterally by said lateral servo means and includes a second optical assembly movably engaged in the vertical direction with said first optical assembly.

* * * * *